United States Patent
Lo et al.

(10) Patent No.: US 10,938,872 B2
(45) Date of Patent: Mar. 2, 2021

(54) PROCESSING INTERACTIVITY EVENTS FOR STREAMING MEDIA DATA

(71) Applicant: QUALCOMM Incorporated, San Diego, CA (US)

(72) Inventors: Charles Nung Lo, San Diego, CA (US); Thomas Stockhammer, Bergen (DE); Giridhar Dhati Mandyam, San Diego, CA (US); Gordon Kent Walker, Poway, CA (US); Waqar Zia, Munich (DE); Ralph Akram Gholmieh, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 60 days.

(21) Appl. No.: 16/298,877

(22) Filed: Mar. 11, 2019

(65) Prior Publication Data
US 2019/0281100 A1     Sep. 12, 2019

Related U.S. Application Data

(60) Provisional application No. 62/641,817, filed on Mar. 12, 2018.

(51) Int. Cl.
*H04L 29/06* (2006.01)
*H04N 21/81* (2011.01)
(Continued)

(52) U.S. Cl.
CPC ...... *H04L 65/4092* (2013.01); *H04L 65/1069* (2013.01); *H04L 65/607* (2013.01);
(Continued)

(58) Field of Classification Search
CPC .... H04N 19/18; H04N 19/186; H04N 19/117; H04N 19/124; H04N 19/136;
(Continued)

(56) References Cited

U.S. PATENT DOCUMENTS

2011/0173275 A1* 7/2011 Beers ............... G06Q 10/10
                                               709/206
2017/0026447 A1* 1/2017 Nair ................ H04N 21/278
(Continued)

FOREIGN PATENT DOCUMENTS

KR    20170140066 A    12/2017

OTHER PUBLICATIONS

3GPP Draft; Dash-Adinsertion V0.9, 3rd Generation Partnership Project (3GPP), Mobile Competence Centre; 650, Route Des Lucioles; F-06921 Sophia-Antipolis Cedex; France, Sep. 1, 2014, XP050943834, Retrieved from the Internet:URL:http://www.3gpp.org/ftp/Meetings_3GPP_SYNC/SA4/Docs/ [retrieved on Jan. 28, 2015] paragraph [4.2.1], 30 pages.

(Continued)

*Primary Examiner* — Djenane M Bayard
(74) *Attorney, Agent, or Firm* — Shumaker & Sieffert, P.A.

(57) ABSTRACT

An example device for retrieving media data includes a streaming client and a media presentation application configured in one or more processors implemented in circuitry. The streaming client is configured to determine a start time for an event message corresponding to an interactivity window during which one or more application-specific interactivity events can occur during presentation of media data, the application-specific interactivity events comprising times during which a user of the device can interact with the presented media data, determine an end time for the event message corresponding to the interactivity window, receive data representative of at least one of the application-specific interactivity events during the interactivity window corresponding to the event message, and forward the data representative of the at least one of the application-specific interactivity events to the media presentation application.

28 Claims, 12 Drawing Sheets

(51) Int. Cl.
  *H04N 21/845* (2011.01)
  *H04N 21/4722* (2011.01)
  *H04N 21/4545* (2011.01)

(52) U.S. Cl.
  CPC ... *H04N 21/45457* (2013.01); *H04N 21/4722* (2013.01); *H04N 21/812* (2013.01); *H04N 21/8173* (2013.01); *H04N 21/8456* (2013.01)

(58) Field of Classification Search
  CPC .. H04N 19/147; H04N 19/176; H04N 19/187; H04N 19/196; H04N 19/33; H04N 19/34; H04N 19/46; H04N 19/61; H04N 19/70; H04N 5/225; H04N 5/2254; H04N 13/30; H04N 13/32; H04N 13/39; H04N 19/115; H04N 19/14; H04N 19/149; H04N 19/182; H04N 19/80; H04N 19/82; H04N 19/86; H04N 1/0083; H04N 1/387; H04N 2101/00; H04N 2201/0084; H04N 5/23287; H04N 5/3572; H04N 21/4758; H04N 21/23424; H04N 21/42203; H04N 21/42204; H04N 21/4307; H04N 21/431; H04N 21/4312; H04N 21/4316; H04N 21/47205; H04N 21/4751; H04N 21/47815; H04N 21/4788; H04N 21/4826; H04N 21/485; H04N 21/6543; H04N 21/6582; H04N 21/8173; H04N 21/8453; H04N 21/8456; H04N 5/23206; H04N 5/445; H04N 21/252; H04N 21/25825; H04N 21/25841; H04N 21/2665; H04N 21/41407; H04N 21/4227; H04N 21/435; H04N 21/43615; H04N 21/44008; H04N 21/4524; H04N 21/458; H04N 21/4583; H04N 21/47211; H04N 21/4755; H04N 21/488; H04N 21/8455; H04N 21/8547; H04N 21/858; H04N 5/23238; H04N 5/23293; H04N 5/232933; H04N 5/247
  See application file for complete search history.

(56) References Cited

U.S. PATENT DOCUMENTS

| | | | |
|---|---|---|---|
| 2017/0310722 A1 | 10/2017 | Chen et al. | |
| 2017/0344955 A1* | 11/2017 | Kim | G06F 3/0486 |
| 2018/0035139 A1* | 2/2018 | Giladi | H04L 65/607 |
| 2018/0035153 A1* | 2/2018 | Yang | H04N 21/4104 |
| 2018/0139507 A1* | 5/2018 | Toksoz | A63F 13/355 |
| 2019/0149857 A1 | 5/2019 | Lo et al. | |
| 2020/0162793 A1* | 5/2020 | Christensen | H04N 21/8173 |

OTHER PUBLICATIONS

"3GPP TS 26.347, V14.2.0, 3rd Generation Partnership Project; Technical Specification Group Services and System Aspects; Multimedia Broadcast/Multicast Service (MBMS); Application Programming Interface and URL, (Release 14)", Sep. 2017, 124 pages.
ATSC Candidate Standard: Application Signaling (A/337), Doc. S33-337r1, Oct. 31, 2017, 35 pages.
ATSC Standard: ATSC 3.0 Interactive Content, A/344:2017, Dec. 18, 2017, 134 pages.
ATSC Working Draft: ATSC 3.0 Interactive Content, S34-4-536r2, Jan. 25, 2018, 155 pages.
DVB Organization: "A337S33-215r1-Application-Signaling-1.pdf", DVB, Digital Video Broadcasting, C/0 EBU—17A Ancienne Route—CH-1218 Grand Saconnex, Geneva—Switzerland, Jan. 23, 2017, XP017852620, paragraphs [04.2], [5.1.1.], 25 pages.
Fielding R., et al., "Hypertext Transfer Protocol—HTTP/1.1", Network Working Group, Request for Comments, RFC 2616, Jun. 1999, 114 Pages.
Guidelines for Implementation: DASH-IF Interoperability Point for ATSC 3.0, Jun. 12, 2018, DASH Industry Forum, Version 1.1, 72 pages.
"Guidelines for Implementations: DASH-IF Interoperability Points," Version 4.0, DASH Industry Forum, Dec. 12, 2016, 168 pages.
International Search Report and Written Opinion—PCT/US2019/021924—ISA/EPO—May 7, 2019—17 pp.
International Standard., "Information Technology—Dynamic Adaptive Streaming over HTTP (DASH)—Part 1: Media Presentation Description and Segment Formats", MPEG Meeting;Oct. 19, 2015-Oct. 23, 2015; Geneva; (Motion Picture Expert Group or ISO/IEC JTC1/SC29/WG11), No. N15686, ISO/IEC 23009-1, Third Edition, XP030022374, Dec. 8, 2015, 191 pp.
"ITU-T H.265, Series H: Audiovisual and Multimedia Systems, Infrastructure of audiovisual services—Coding of moving video, High efficiency video coding," The International Telecommunication Union, Apr. 2015, 634 pp, please consider section 7.4.9.6 on p. 102, section 8.5.3.2.6 on p. 141, section 8.5.3.2.7 on pp. 141-145, and section 8.5.3.2.8 on p. 145.
Paila T., et al., "Flute—File Delivery over Unidirectional Transport," Network Working Group, RFC 6726, Nov. 2012, 46 Pages, Retrieved from the Internet http://tools.ietf.org/html/rfc6726.
"Processing Model of DASH Client for Application-specific Events", 3GPP Draft; Dasheventprocessingmodel-V2.3, 3rd Generation Partnership Project (3GPP), Mobile Competence Centre; 650, Route Des Lucioles; F-06921 Sophia-Antipolis Cedex; France, Jul. 9, 2018, XP051542675, Retrieved from the Internet: URL:http://www.3gpp.org/ftp/tsg%5Fsa/WG4%5FCODEC/TSGS4%5F99/Docs/S4%2DI80848%2Ezip [retrieved on Jul. 9, 2018], 13 pages.
Sodagar I., et al., (LIVE): "[AMD5] DASH Client Processing Model for Application Events", 123th MPEG Meeting; Jul. 16, 2018-Jul. 20, 2018; Ljubljana; (Motion Picture Expert Group or ISO/IEC JTC1/SC29/WG11), No. m43560, Jul. 11, 2018, XP030196803, Retrieved from the Internet: URL:http://phenix.int-evry.fr/mpeg/doc_end_user/documents/123_Ljubljanajwg11/m43560-v1-m43560-DASHEventAPI-v0.zipm43560-DASHEventAPI-v0.docx [retrieved on Jul. 11, 2018], 8 pages.
Sodagar I., (LIVE): "[Dul] Fixing Event Start Time and Time Scale for inband and MPD Events", 123th MPEG Meeting; Jul. 16, 2018-Jul. 20, 2018; Ljubljana; (Motion Picture Expert Group or ISO/IEC JTC1/SC29/WG11), No. m43563, Jul. 11, 2018, XP030196805, Retrieved from the Interet: URL:http://phenix.int-evry.fr/mpeg/doc_end_user/documents/123_Ljubljana/wg11/m43563-[Dul]FixingEventStartTimeandtime.zipm43563-[Dul]_Fixing_Event_Start_Time_and_time_scale.docx [retrieved on Jul. 11, 2018], 8 pages.
Stockhammert T., "WD on Carriage of Web Resouce in ISOBMFF (ISO/IEC 23001-15)", ISO/IEC JTC1/SC29/WG11 N17242, Oct. 2017, 15 pages.
"Technologies under Consideration for DASH", 123th MPEG Meeting; Jul. 16, 2018-Jul. 20, 2018; Ljubljana; (Motion Picture Expert Group or ISO/IEC JTC1/SC29/WG11), No. n17812, Jul. 20, 2018, XP030197563, Retrieved from the Internet: URL:http://phenix.int-evry.fr/mpeg/doc_end_user/documents/123_Ljubljana/wg11/w17812.zip_w17812-DASH_TuC.docx [retrieved on Jul. 20, 2018], 115 pages.
3GPP TS 26.247, "3rd Generation Partnership Project; Technical Specification Group Services and System Aspects; Transparent end-to-end Packet-switched Streaming Service (PSS); Progressive Download and Dynamic Adaptive Streaming Over HTTP (3GP-DASH) (Release 15)", 3GPP TS 26.247, V15.1.0, Dec. 2017, 128 Pages.
"DASH-IF Implementation Guidelines: Dash Events and Timed Metadata Tracks Timing and Processing Model and Client Reference Model", Dash Industry Forum, Version 1.0.2 (Final), Dec. 20, 2019, pp. 1-21.

* cited by examiner

PROCESSING INTERACTIVITY EVENTS FOR STREAMING MEDIA DATA

This application claims the benefit of U.S. Provisional Application No. 62/641,817, filed Mar. 12, 2018, the entire contents of which are hereby incorporated by reference.

TECHNICAL FIELD

This disclosure relates to storage and transport of encoded video data.

BACKGROUND

Digital video capabilities can be incorporated into a wide range of devices, including digital televisions, digital direct broadcast systems, wireless broadcast systems, personal digital assistants (PDAs), laptop or desktop computers, digital cameras, digital recording devices, digital media players, video gaming devices, video game consoles, cellular or satellite radio telephones, video teleconferencing devices, and the like. Digital video devices implement video compression techniques, such as those described in the standards defined by MPEG-2, MPEG-4, ITU-T H.263 or ITU-T H.264/MPEG-4, Part 10, Advanced Video Coding (AVC), ITU-T H.265 (also referred to as High Efficiency Video Coding (HEVC)), and extensions of such standards, to transmit and receive digital video information more efficiently.

After video data has been encoded, the video data may be packetized for transmission or storage. The video data may be assembled into a video file conforming to any of a variety of standards, such as the International Organization for Standardization (ISO) base media file format and extensions thereof, such as AVC.

SUMMARY

In general, this disclosure describes techniques for processing data related to an interactivity event for streamed media data. An interactivity event generally corresponds to an event during which a user can interact with streamed media content, such as advertisements. Interactivity events may be signaled for unplanned advertisements, that is, advertisements corresponding to periods of time during a live broadcast that cannot be predicted ahead of time, such as advertisements during a live sporting event time-out, period or quarter change, or the like. According to some examples of the techniques of this disclosure, data representing an interactivity window, during which one or more application-specific interactivity events may occur, may be signaled to a streaming client, such as a Dynamic Adaptive Streaming over HTTP (DASH) client or an HTTP Live Streaming (HLS) client. The streaming client may deliver application-specific interactivity events within the interactivity window to a corresponding application, but not deliver events outside of the interactivity window.

In one example, a method of receiving media data includes determining, by a streaming client of a device, the streaming client implemented in circuitry of the device, a start time for an event message corresponding to an interactivity window during which one or more application-specific interactivity events can occur during presentation of media data, the application-specific interactivity events comprising times during which a user of the device can interact with the presented media data, determining, by the streaming client, an end time for the event message corresponding to the interactivity window, receiving, by the streaming client, data representative of at least one of the application-specific interactivity events during the interactivity window corresponding to the event message, and forwarding, by the streaming client, the data representative of the at least one of the application-specific interactivity events to a media presentation application of the device, the media presentation application implemented in circuitry of the device.

In another example, a device for receiving media data includes a streaming client and a media presentation application configured in one or more processors implemented in circuitry, wherein the streaming client is configured to determine a start time for an event message corresponding to an interactivity window during which one or more application-specific interactivity events can occur during presentation of media data, the application-specific interactivity events comprising times during which a user of the device can interact with the presented media data, determine an end time for the event message corresponding to the interactivity window, receive data representative of at least one of the application-specific interactivity events during the interactivity window corresponding to the event message, and forward the data representative of the at least one of the application-specific interactivity events to the media presentation application.

In another example, a computer-readable storage medium has stored thereon instructions that, when executed, cause a processor executing a streaming client to determine a start time for an event message corresponding to an interactivity window during which one or more application-specific interactivity events can occur during presentation of media data, the application-specific interactivity events comprising times during which a user of the device can interact with the presented media data, determine an end time for the event message corresponding to the interactivity window, receive data representative of at least one of the application-specific interactivity events during the interactivity window corresponding to the event message, and forward the data representative of the at least one of the application-specific interactivity events to a media presentation application of a device including the processor.

In another example, a device for receiving media data includes a media presentation application configured in one or more processors implemented in circuitry of the device, means for determining a start time for an interactivity window for an interactivity window during which one or more application-specific interactivity events can occur during presentation of media data, the application-specific interactivity events comprising times during which a user of the device can interact with the presented media data, means for determining an end time for the interactivity window, means for receiving data representative of at least one of the event messages corresponding to interactivity event messages during the interactivity window, and means for forwarding the data representative of the at least one of the event messages corresponding to interactivity event messages to the media presentation application.

The details of one or more examples are set forth in the accompanying drawings and the description below. Other features, objects, and advantages will be apparent from the description and drawings, and from the claims.

DETAILED DESCRIPTION

Figure 1:
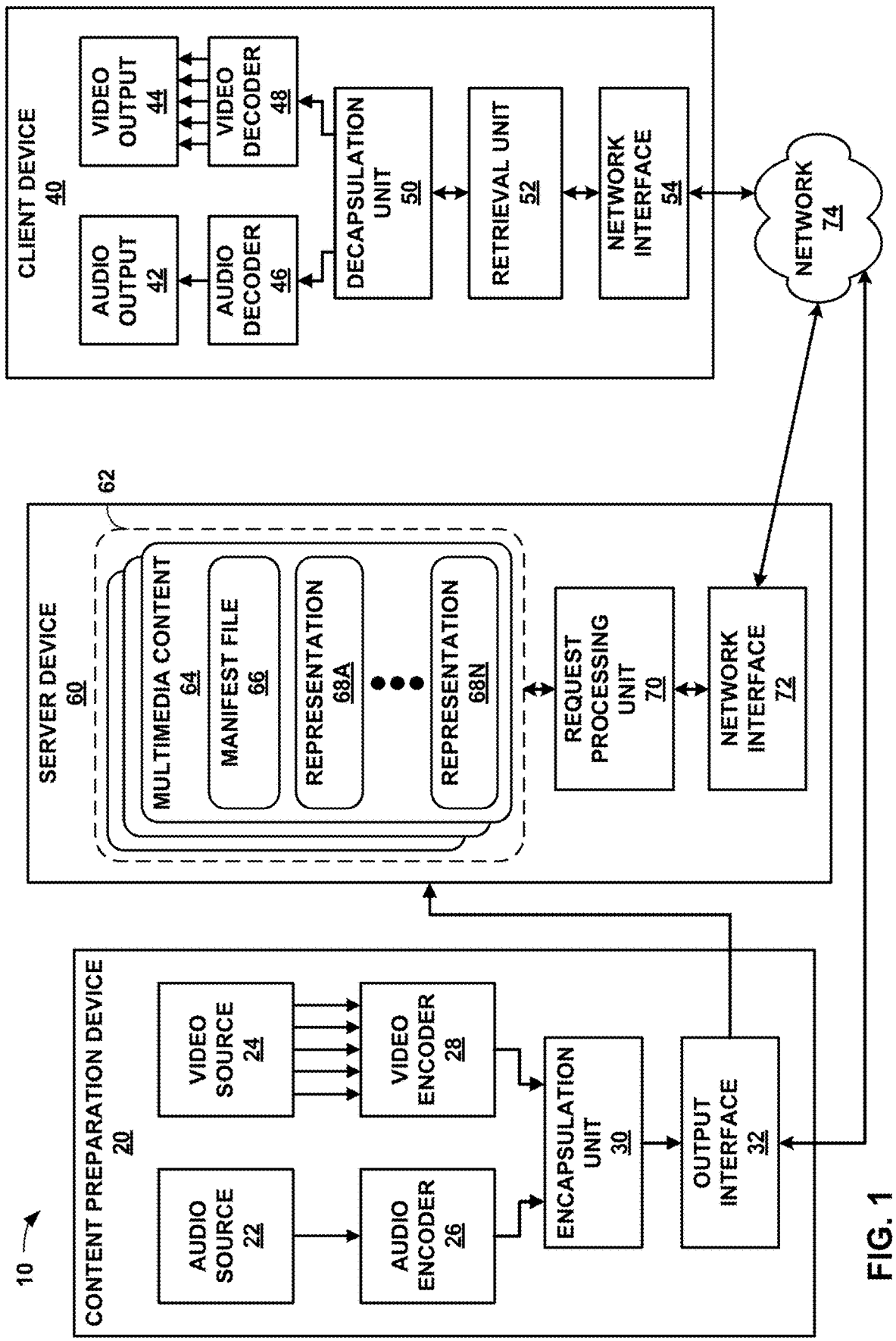
FIG. 1 is a block diagram illustrating an example system that implements techniques for streaming media data over a network.

In general, this disclosure describes techniques for processing data related to an interactivity event for streamed media data. An interactivity event generally corresponds to an event during which a user can interact with streamed media content, such as advertisements. Interactivity events may be signaled for unplanned advertisements, that is, advertisements corresponding to periods of time during a live broadcast that cannot be predicted ahead of time, such as advertisements during a live sporting event time-out, period or quarter change, or the like. According to the techniques of this disclosure, data representing an interactivity window, during which one or more application-specific interactivity events may occur, may be signaled to a streaming client, such as a Dynamic Adaptive Streaming over HTTP (DASH) client. The DASH client may deliver application-specific interactivity events within the interactivity window to a corresponding application, but not deliver events outside of the interactivity window.

As an example use case, assume that during a user's viewing of a DASH-formatted live event, e.g., a football game, for which program delivery could be either via broadcast or unicast via a program-specific application (e.g., "XYZPro Football"), there are expected breaks in the program at which regular or replacement content is played and that contain interactivity content or a user interface (UI) allowing the user to engage with the displayed program content (e.g. inserted ads). The time interval within such breaks during which interactivity is possible is referred to herein as an "interactivity event."

Another example type of interactivity event pertains to occurrences of significant actions during the game, such as plays which lead to a touchdown, result in significant yardage gains or loss, etc. For this type of interactivity event, the game continues without any breaks, but is accompanied for a certain duration by superimposed interactive content or UI made available to the user. Such interactive content may, for example, concern statistics or other accessible information about the main player involved in the previous play.

The program breaks or game actions and associated interactivity events may occur due to expected occurrences of events. For example, with respect to the example of a football game, events may include time outs, scoring of touchdowns, transition between different periods of the game, half-time, possibly news/emergency alerts to be presented during the game, and the like. Incidence times or durations for such events generally cannot be exactly predicted in advance.

It is assumed that an active program-specific application, such as a football application, supports service interactivity. When the application is launched, it may subscribe with the DASH client for delivery of information included in interactivity-specific events. The interactivity service provider may display such interactive content during the interactivity events according to the application logic of the application, which is assumed to be consistent with the licensing terms of the streaming content.

Assume, for purpose of example, that during a football game, a time-out is called in the $1^{st}$ quarter. This leads to two minutes of advertisements to be played during the break in the program and the sending of DASH Event messages corresponding to the type subscribed by the application, and the interactivity-related information contained in the events will be forwarded by the DASH client at the appropriate times to the application. Such event information may enable the application to determine the appropriate interactivity logic to be executed and the associated interactive content to be displayed during the course of the corresponding interactivity event—for example, 1.5 minutes in duration and occurring within the two-minute interval of ad play-out during the inserted ad period(s). In this example, the application may present its supplemental, interactivity-related content that is synchronized to the main program (the displayed advertisements), for example, a superimposed display of a graphical overlay or set of UI controls, at particular moments in the main content, during the interactivity event.

When this interactivity event concludes, execution of the associated interactivity logic may cease. It may be expected at such time, should the program break not yet be over, that the ad that was playing will no longer contain any embedded interactive content, and upon conclusion of the advertisement, the game resumes.

Continuing the example above, later on, in the $2^{nd}$ quarter of the game, the quarterback of the visiting team is sacked for a big loss in yardage. This occurrence may lead to a second interactivity event that differs from the first, in that there is no break or pause in the game, but overlaid onto the ongoing program is interactive content or UI controls which allow the end-user to view statistics or other information about the home team players responsible for making the big play. This interactivity event is similarly triggered by the delivery from the network and reception by the DASH client of interactivity-specific DASH Events, and forwarding of the application-related information contained in those Events to the application. Similar also to the previous example interactivity event, such event information provided to the application enables the application to execute the appropriate logic, resulting in interactive display(s) during the validity time of the interactivity event.

Additional program breaks or key plays that trigger the occurrence of interactivity events may repeat during the course of the game.

The following assumptions may apply regarding the above example use case. A first assumption is that the main service application (e.g., XYZPro Football), which is interactivity-capable (and simply referred to as the "media application," "application," or "app" in this disclosure) contains built-in logic which dictates the specific interactivity content or UI controls to be rendered at explicit times during the interactivity event. The main service application may always be running in playing the program content, whereas execution of the interactivity logic is temporary. That is, the interactivity logic may be executed only during instances of interactivity events in the main program.

A second assumption is that there may be multiple branches of interactivity logic to be selectively executed by the app during an interactivity event, associated with unique identifiers.

A third assumption is that the app is able to access accurate clock information with the desired resolution (e.g., millisecond) and known frequency via an operating system (OS)-specific system clock application programming interface (API).

A fourth assumption is that, in the case that an interactivity event occurs during a program break for which auxiliary content such as one or more adverts are presented as the main content, the duration of an interactivity event is less than or equal to the overall duration of the program break.

A fifth assumption is that DASH Event information forwarded from the DASH client to the application will identify to the app the specific logic to be executed for the corresponding interactivity event, and may contain additional, app-specific data in support of such execution.

In some examples, a sixth assumption is that the DASH client, upon detecting an event matching the subscription, will dispatch to the app the contained event information at precisely the moment that the current media presentation time matches the event's start time as signaled in the event. Alternatively, the DASH client may dispatch an event matching the subscription before the scheduled event start time, along with data representing the start time for the event.

A seventh assumption is that, in the case the forwarding of event information by the DASH client to the application occurs at its current media presentation time $T_1$ that is later than the event's start time $T_0$, but before the event's expiration $T_2$ (and where $T_0<T_1<T_2$), the event information will additionally include $T_1$ (to allow the app to adjust the logic for execution and associated interactive content display in accordance to the shortened interactivity event duration).

An eighth assumption is that media assets required by the application for display during the interactivity event are either already acquired by the app, or dynamically fetched by the app upon receiving the event notification from the DASH client, such that timing of presentation of such media content will meet the requirement of the interactivity logic executed during the interactivity event. In the case of broadcast delivery of the DASH streaming service, those media assets may be delivered as non-real-time (NRT) files and downloaded by the receiver and forwarded to the app in advance of the interactivity event during which these media files are displayed. In the case of unicast delivery of the DASH streaming service, those media files, if not already acquired by the application, may be dynamically obtainable by the app via HTTP(S), after it has received the associated event information from the DASH client, in fulfillment of the display times intended by the interactivity logic. In other words, the interactivity event logic is expected to accommodate typically-expected latency for real-time acquisition of media assets for display during the interactivity event. In the event a specific media file cannot be acquired over HTTP(S) in a timely manner (to meet the intended display time), back-up content, already cached in the user device, may be presented in its place. Media files for display during interactivity events may be cached in the user device for possible repeated use in future interactivity events.

A ninth assumption is that, although not explicitly described in the above use case, an ongoing interactivity event might occasionally be dynamically and abruptly terminated, since program breaks during a sports event or other live event do not always abide by explicit and pre-defined start and end times. For example, the temporary halt of a game due to an injury time-out could at times be shorter in duration than that planned by the main service/content provider, such that resumption of the game might occur prior to completion of the intended interactive user experience associated with the interactivity event.

Example capabilities of the event API based on the use case description above and associated set of assumptions include the following. The interactivity-capable main service application may be able to subscribe with the DASH client for the desired interactivity event information delivered as DASH Events by, e.g., schemeIdUri and optionally a value associated with that scheme. Normally, via the event API, the DASH client may deliver to the app the interactivity event related information contained in DASH events that match the subscribed schemeIdUri/value, at precisely the moment that the current media presentation time matches the Event's derived start time. The DASH client may forward to the application a) the Event identifier and b) payload of the message data parameters contained in the Event, such as the @id and @messageData attributes for MPD Events, and the id and message_data fields for inband Events ('emsg' box). In the event that the DASH client delivers the interactivity event related information to the application at a time later than the Event's derived start time, but prior to its expiration, then the value of the media presentation time at which such event information is forwarded may be included, along with the Event's id and message data.

The techniques of this disclosure include a streaming client, such as a DASH client, processing model corresponding to a high-level timing model for interactivity-specific DASH Events, sent as either MPD Events or inband Events ('emsg'). This disclosure recognizes that, with respect to the ATSC 3.0 model, where the streaming client passes the entirety of event information to a media application:

1. The ATSC model may incur high processing load on the media application when the media application has to act as a media player. The media application may obtain and maintain media presentation time, perform media buffering, and the like, to synchronize interactivity events with main content.
2. Two example approaches are described in this disclosure for providing Event information from the streaming client (e.g., DASH client) to the media application via, e.g., an Event API, as described in U.S. Provisional Application No. 62/584,344, filed Nov. 10, 2017, and U.S. Provisional Application No. 62/584,494, filed Nov. 10, 2017, the primary differences being:
    a. In the first example method, the streaming client provides event duration information by timing information contained in 'emsg'—namely, timescale and event_duration parameters.
b. In the second example method, the streaming client provides event duration information within a message_data field in 'emsg.'
c. In both example methods, the media application processing overhead may be reduced by having the streaming client, e.g., DASH client, be configured to handle event synchronization with media timing. In some example operations, the streaming client may dispatch Event information to the media application precisely when the current media time equals the Event's presentation_time (assuming the use of inband Events/"emsg' boxes) and provides no additional information to the app such as the current media time or Event start time.

The techniques of this disclosure may be applied to video files conforming to video data encapsulated according to any of ISO base media file format, Scalable Video Coding (SVC) file format, Advanced Video Coding (AVC) file format, Third Generation Partnership Project (3GPP) file format, and/or Multiview Video Coding (MVC) file format, or other similar video file formats.

In HTTP streaming, frequently used operations include HEAD, GET, and partial GET. The HEAD operation retrieves a header of a file associated with a given uniform resource locator (URL) or uniform resource name (URN), without retrieving a payload associated with the URL or URN. The GET operation retrieves a whole file associated with a given URL or URN. The partial GET operation receives a byte range as an input parameter and retrieves a continuous number of bytes of a file, where the number of bytes correspond to the received byte range. Thus, movie fragments may be provided for HTTP streaming, because a partial GET operation can get one or more individual movie fragments. In a movie fragment, there can be several track fragments of different tracks. In HTTP streaming, a media presentation may be a structured collection of data that is accessible to the client. The client may request and download media data information to present a streaming service to a user.

In the example of streaming 3GPP data using HTTP streaming, there may be multiple representations for video and/or audio data of multimedia content. As explained below, different representations may correspond to different coding characteristics (e.g., different profiles or levels of a video coding standard), different coding standards or extensions of coding standards (such as multiview and/or scalable extensions), or different bitrates. The manifest of such representations may be defined in a Media Presentation Description (MPD) data structure. A media presentation may correspond to a structured collection of data that is accessible to an HTTP streaming client device. The HTTP streaming client device may request and download media data information to present a streaming service to a user of the client device. A media presentation may be described in the MPD data structure, which may include updates of the MPD.

A media presentation may contain a sequence of one or more Periods. Each period may extend until the start of the next Period, or until the end of the media presentation, in the case of the last period. Each period may contain one or more representations for the same media content. A representation may be one of a number of alternative encoded versions of audio, video, timed text, or other such data. The representations may differ by encoding types, e.g., by bitrate, resolution, and/or codec for video data and bitrate, language, and/or codec for audio data. The term representation may be used to refer to a section of encoded audio or video data corresponding to a particular period of the multimedia content and encoded in a particular way.

Representations of a particular period may be assigned to a group indicated by an attribute in the MPD indicative of an adaptation set to which the representations belong. Representations in the same adaptation set are generally considered alternatives to each other, in that a client device can dynamically and seamlessly switch between these representations, e.g., to perform bandwidth adaptation. For example, each representation of video data for a particular period may be assigned to the same adaptation set, such that any of the representations may be selected for decoding to present media data, such as video data or audio data, of the multimedia content for the corresponding period. The media content within one period may be represented by either one representation from group 0, if present, or the combination of at most one representation from each non-zero group, in some examples. Timing data for each representation of a period may be expressed relative to the start time of the period.

A representation may include one or more segments. Each representation may include an initialization segment, or each segment of a representation may be self-initializing. When present, the initialization segment may contain initialization information for accessing the representation. In general, the initialization segment does not contain media data. A segment may be uniquely referenced by an identifier, such as a uniform resource locator (URL), uniform resource name (URN), or uniform resource identifier (URI). The MPD may provide the identifiers for each segment. In some examples, the MPD may also provide byte ranges in the form of a range attribute, which may correspond to the data for a segment within a file accessible by the URL, URN, or URI.

Different representations may be selected for substantially simultaneous retrieval for different types of media data. For example, a client device may select an audio representation, a video representation, and a timed text representation from which to retrieve segments. In some examples, the client device may select particular adaptation sets for performing bandwidth adaptation. That is, the client device may select an adaptation set including video representations, an adaptation set including audio representations, and/or an adaptation set including timed text. Alternatively, the client device may select adaptation sets for certain types of media (e.g., video), and directly select representations for other types of media (e.g., audio and/or timed text).

FIG. 1 is a block diagram illustrating an example system 10 that implements techniques for streaming media data over a network. In this example, system 10 includes content preparation device 20, server device 60, and client device 40. Client device 40 and server device 60 are communicatively coupled by network 74, which may comprise the Internet. In some examples, content preparation device 20 and server device 60 may also be coupled by network 74 or another network, or may be directly communicatively coupled. In some examples, content preparation device 20 and server device 60 may comprise the same device.

Content preparation device 20, in the example of FIG. 1, comprises audio source 22 and video source 24. Audio source 22 may comprise, for example, a microphone that produces electrical signals representative of captured audio data to be encoded by audio encoder 26. Alternatively, audio source 22 may comprise a storage medium storing previously recorded audio data, an audio data generator such as a computerized synthesizer, or any other source of audio data. Video source 24 may comprise a video camera that produces video data to be encoded by video encoder 28, a storage medium encoded with previously recorded video data, a video data generation unit such as a computer graphics source, or any other source of video data. Content preparation device 20 is not necessarily communicatively coupled to server device 60 in all examples, but may store multimedia content to a separate medium that is read by server device 60.

Raw audio and video data may comprise analog or digital data. Analog data may be digitized before being encoded by audio encoder 26 and/or video encoder 28. Audio source 22 may obtain audio data from a speaking participant while the speaking participant is speaking, and video source 24 may simultaneously obtain video data of the speaking participant. In other examples, audio source 22 may comprise a computer-readable storage medium comprising stored audio data, and video source 24 may comprise a computer-readable storage medium comprising stored video data. In this manner, the techniques described in this disclosure may be applied to live, streaming, real-time audio and video data or to archived, pre-recorded audio and video data.

Audio frames that correspond to video frames are generally audio frames containing audio data that was captured (or generated) by audio source 22 contemporaneously with video data captured (or generated) by video source 24 that is contained within the video frames. For example, while a speaking participant generally produces audio data by speaking, audio source 22 captures the audio data, and video source 24 captures video data of the speaking participant at the same time, that is, while audio source 22 is capturing the audio data. Hence, an audio frame may temporally correspond to one or more particular video frames. Accordingly, an audio frame corresponding to a video frame generally corresponds to a situation in which audio data and video data were captured at the same time and for which an audio frame and a video frame comprise, respectively, the audio data and the video data that was captured at the same time.

In some examples, audio encoder 26 may encode a timestamp in each encoded audio frame that represents a time at which the audio data for the encoded audio frame was recorded, and similarly, video encoder 28 may encode a timestamp in each encoded video frame that represents a time at which the video data for encoded video frame was recorded. In such examples, an audio frame corresponding to a video frame may comprise an audio frame comprising a timestamp and a video frame comprising the same timestamp. Content preparation device 20 may include an internal clock from which audio encoder 26 and/or video encoder 28 may generate the timestamps, or that audio source 22 and video source 24 may use to associate audio and video data, respectively, with a timestamp.

In some examples, audio source 22 may send data to audio encoder 26 corresponding to a time at which audio data was recorded, and video source 24 may send data to video encoder 28 corresponding to a time at which video data was recorded. In some examples, audio encoder 26 may encode a sequence identifier in encoded audio data to indicate a relative temporal ordering of encoded audio data but without necessarily indicating an absolute time at which the audio data was recorded, and similarly, video encoder 28 may also use sequence identifiers to indicate a relative temporal ordering of encoded video data. Similarly, in some examples, a sequence identifier may be mapped or otherwise correlated with a timestamp.

Audio encoder 26 generally produces a stream of encoded audio data, while video encoder 28 produces a stream of encoded video data. Each individual stream of data (whether audio or video) may be referred to as an elementary stream. An elementary stream is a single, digitally coded (possibly compressed) component of a representation. For example, the coded video or audio part of the representation can be an elementary stream. An elementary stream may be converted into a packetized elementary stream (PES) before being encapsulated within a video file. Within the same representation, a stream ID may be used to distinguish the PES-packets belonging to one elementary stream from the other. The basic unit of data of an elementary stream is a packetized elementary stream (PES) packet. Thus, coded video data generally corresponds to elementary video streams. Similarly, audio data corresponds to one or more respective elementary streams.

Many video coding standards, such as ITU-T H.264/AVC and the upcoming High Efficiency Video Coding (HEVC) standard, define the syntax, semantics, and decoding process for error-free bitstreams, any of which conform to a certain profile or level. Video coding standards typically do not specify the encoder, but the encoder is tasked with guaranteeing that the generated bitstreams are standard-compliant for a decoder. In the context of video coding standards, a "profile" corresponds to a subset of algorithms, features, or tools and constraints that apply to them. As defined by the H.264 standard, for example, a "profile" is a subset of the entire bitstream syntax that is specified by the H.264 standard. A "level" corresponds to the limitations of the decoder resource consumption, such as, for example, decoder memory and computation, which are related to the resolution of the pictures, bit rate, and block processing rate. A profile may be signaled with a profile_idc (profile indicator) value, while a level may be signaled with a level_idc (level indicator) value.

The H.264 standard, for example, recognizes that, within the bounds imposed by the syntax of a given profile, it is still possible to require a large variation in the performance of encoders and decoders depending upon the values taken by syntax elements in the bitstream such as the specified size of the decoded pictures. The H.264 standard further recognizes that, in many applications, it is neither practical nor economical to implement a decoder capable of dealing with all hypothetical uses of the syntax within a particular profile. Accordingly, the H.264 standard defines a "level" as a specified set of constraints imposed on values of the syntax elements in the bitstream. These constraints may be simple limits on values. Alternatively, these constraints may take the form of constraints on arithmetic combinations of values (e.g., picture width multiplied by picture height multiplied by number of pictures decoded per second). The H.264 standard further provides that individual implementations may support a different level for each supported profile.

A decoder conforming to a profile ordinarily supports all the features defined in the profile. For example, as a coding feature, B-picture coding is not supported in the baseline profile of H.264/AVC but is supported in other profiles of H.264/AVC. A decoder conforming to a level should be capable of decoding any bitstream that does not require resources beyond the limitations defined in the level. Definitions of profiles and levels may be helpful for interpretability. For example, during video transmission, a pair of profile and level definitions may be negotiated and agreed for a whole transmission session. More specifically, in H.264/AVC, a level may define limitations on the number of macroblocks that need to be processed, decoded picture buffer (DPB) size, coded picture buffer (CPB) size, vertical motion vector range, maximum number of motion vectors per two consecutive MBs, and whether a B-block can have sub-macroblock partitions less than 8×8 pixels. In this manner, a decoder may determine whether the decoder is capable of properly decoding the bitstream.

In the example of FIG. 1, encapsulation unit 30 of content preparation device 20 receives elementary streams comprising coded video data from video encoder 28 and elementary streams comprising coded audio data from audio encoder 26. In some examples, video encoder 28 and audio encoder 26 may each include packetizers for forming PES packets from encoded data. In other examples, video encoder 28 and audio encoder 26 may each interface with respective packetizers for forming PES packets from encoded data. In still other examples, encapsulation unit 30 may include packetizers for forming PES packets from encoded audio and video data.

Video encoder 28 may encode video data of multimedia content in a variety of ways, to produce different representations of the multimedia content at various bitrates and with various characteristics, such as pixel resolutions, frame rates, conformance to various coding standards, conformance to various profiles and/or levels of profiles for various coding standards, representations having one or multiple views (e.g., for two-dimensional or three-dimensional playback), or other such characteristics. A representation, as used in this disclosure, may comprise one of audio data, video data, text data (e.g., for closed captions), or other such data. The representation may include an elementary stream, such as an audio elementary stream or a video elementary stream. Each PES packet may include a stream_id that identifies the elementary stream to which the PES packet belongs. Encapsulation unit 30 is responsible for assembling elementary streams into video files (e.g., segments) of various representations.

Encapsulation unit 30 receives PES packets for elementary streams of a representation from audio encoder 26 and video encoder 28 and forms corresponding network abstraction layer (NAL) units from the PES packets. Coded video segments may be organized into NAL units, which provide a "network-friendly" video representation addressing applications such as video telephony, storage, broadcast, or streaming. NAL units can be categorized to Video Coding Layer (VCL) NAL units and non-VCL NAL units. VCL units may contain the core compression engine and may include block, macroblock, and/or slice level data. Other NAL units may be non-VCL NAL units. In some examples, a coded picture in one time instance, normally presented as a primary coded picture, may be contained in an access unit, which may include one or more NAL units.

Non-VCL NAL units may include parameter set NAL units and SEI NAL units, among others. Parameter sets may contain sequence-level header information (in sequence parameter sets (SPS)) and the infrequently changing picture-level header information (in picture parameter sets (PPS)). With parameter sets (e.g., PPS and SPS), infrequently changing information need not to be repeated for each sequence or picture, hence coding efficiency may be improved. Furthermore, the use of parameter sets may enable out-of-band transmission of the important header information, avoiding the need for redundant transmissions for error resilience. In out-of-band transmission examples, parameter set NAL units may be transmitted on a different channel than other NAL units, such as SEI NAL units.

Supplemental Enhancement Information (SEI) may contain information that is not necessary for decoding the coded pictures samples from VCL NAL units, but may assist in processes related to decoding, display, error resilience, and other purposes. SEI messages may be contained in non-VCL NAL units. SEI messages are the normative part of some standard specifications, and thus are not always mandatory for standard compliant decoder implementation. SEI messages may be sequence level SEI messages or picture level SEI messages. Some sequence level information may be contained in SEI messages, such as scalability information SEI messages in the example of SVC and view scalability information SEI messages in MVC. These example SEI messages may convey information on, e.g., extraction of operation points and characteristics of the operation points. In addition, encapsulation unit 30 may form a manifest file, such as a media presentation descriptor (MPD) that describes characteristics of the representations. Encapsulation unit 30 may format the MPD according to extensible markup language (XML).

Encapsulation unit 30 may provide data for one or more representations of multimedia content, along with the manifest file (e.g., the MPD) to output interface 32. Output interface 32 may comprise a network interface or an interface for writing to a storage medium, such as a universal serial bus (USB) interface, a CD or DVD writer or burner, an interface to magnetic or flash storage media, or other interfaces for storing or transmitting media data. Encapsulation unit 30 may provide data of each of the representations of multimedia content to output interface 32, which may send the data to server device 60 via network transmission or storage media. In the example of FIG. 1, server device 60 includes storage medium 62 that stores various multimedia contents 64, each including a respective manifest file 66 and one or more representations 68A-68N (representations 68). In some examples, output interface 32 may also send data directly to network 74.

In some examples, representations 68 may be separated into adaptation sets. That is, various subsets of representations 68 may include respective common sets of characteristics, such as codec, profile and level, resolution, number of views, file format for segments, text type information that may identify a language or other characteristics of text to be displayed with the representation and/or audio data to be decoded and presented, e.g., by speakers, camera angle information that may describe a camera angle or real-world camera perspective of a scene for representations in the adaptation set, rating information that describes content suitability for particular audiences, or the like.

Manifest file 66 may include data indicative of the subsets of representations 68 corresponding to particular adaptation sets, as well as common characteristics for the adaptation sets. Manifest file 66 may also include data representative of individual characteristics, such as bitrates, for individual representations of adaptation sets. In this manner, an adaptation set may provide for simplified network bandwidth adaptation. Representations in an adaptation set may be indicated using child elements of an adaptation set element of manifest file 66.

Server device 60 includes request processing unit 70 and network interface 72. In some examples, server device 60 may include a plurality of network interfaces. Furthermore, any or all of the features of server device 60 may be implemented on other devices of a content delivery network, such as routers, bridges, proxy devices, switches, or other devices. In some examples, intermediate devices of a content delivery network may cache data of multimedia content 64, and include components that conform substantially to those of server device 60. In general, network interface 72 is configured to send and receive data via network 74.

Request processing unit 70 is configured to receive network requests from client devices, such as client device 40, for data of storage medium 62. For example, request processing unit 70 may implement hypertext transfer protocol (HTTP) version 1.1, as described in RFC 2616, "Hypertext Transfer Protocol—HTTP/1.1," by R. Fielding et al, Network Working Group, IETF, June 1999. That is, request processing unit 70 may be configured to receive HTTP GET or partial GET requests and provide data of multimedia content 64 in response to the requests. The requests may specify a segment of one of representations 68, e.g., using a URL of the segment. In some examples, the requests may also specify one or more byte ranges of the segment, thus comprising partial GET requests. Request processing unit 70 may further be configured to service HTTP HEAD requests to provide header data of a segment of one of representations 68. In any case, request processing unit 70 may be configured to process the requests to provide requested data to a requesting device, such as client device 40.

Additionally or alternatively, request processing unit 70 may be configured to deliver media data via a broadcast or multicast protocol, such as eMBMS. Content preparation device 20 may create DASH segments and/or sub-segments in substantially the same way as described, but server device 60 may deliver these segments or sub-segments using eMBMS or another broadcast or multicast network transport protocol. For example, request processing unit 70 may be configured to receive a multicast group join request from client device 40. That is, server device 60 may advertise an Internet protocol (IP) address associated with a multicast group to client devices, including client device 40, associated with particular media content (e.g., a broadcast of a live event). Client device 40, in turn, may submit a request to join the multicast group. This request may be propagated throughout network 74, e.g., routers making up network 74, such that the routers are caused to direct traffic destined for the IP address associated with the multicast group to subscribing client devices, such as client device 40.

As illustrated in the example of FIG. 1, multimedia content 64 includes manifest file 66, which may correspond to a media presentation description (MPD). Manifest file 66 may contain descriptions of different alternative representations 68 (e.g., video services with different qualities) and the description may include, e.g., codec information, a profile value, a level value, a bitrate, and other descriptive characteristics of representations 68. Client device 40 may retrieve the MPD of a media presentation to determine how to access segments of representations 68.

In particular, retrieval unit 52 may retrieve configuration data (not shown) of client device 40 to determine decoding capabilities of video decoder 48 and rendering capabilities of video output 44. The configuration data may also include any or all of a language preference selected by a user of client device 40, one or more camera perspectives corresponding to depth preferences set by the user of client device 40, and/or a rating preference selected by the user of client device 40. Retrieval unit 52 may comprise, for example, a web browser or a media client configured to submit HTTP GET and partial GET requests. Retrieval unit 52 may correspond to software instructions executed by one or more processors or processing units (not shown) of client device 40. In some examples, all or portions of the functionality described with respect to retrieval unit 52 may be implemented in hardware, or a combination of hardware, software, and/or firmware, where requisite hardware may be provided to execute instructions for software or firmware.

Retrieval unit 52 may compare the decoding and rendering capabilities of client device 40 to characteristics of representations 68 indicated by information of manifest file 66. Retrieval unit 52 may initially retrieve at least a portion of manifest file 66 to determine characteristics of representations 68. For example, retrieval unit 52 may request a portion of manifest file 66 that describes characteristics of one or more adaptation sets. Retrieval unit 52 may select a subset of representations 68 (e.g., an adaptation set) having characteristics that can be satisfied by the coding and rendering capabilities of client device 40. Retrieval unit 52 may then determine bitrates for representations in the adaptation set, determine a currently available amount of network bandwidth, and retrieve segments from one of the representations having a bitrate that can be satisfied by the network bandwidth.

In general, higher bitrate representations may yield higher quality video playback, while lower bitrate representations may provide sufficient quality video playback when available network bandwidth decreases. Accordingly, when available network bandwidth is relatively high, retrieval unit 52 may retrieve data from relatively high bitrate representations, whereas when available network bandwidth is low, retrieval unit 52 may retrieve data from relatively low bitrate representations. In this manner, client device 40 may stream multimedia data over network 74 while also adapting to changing network bandwidth availability of network 74.

Additionally or alternatively, retrieval unit 52 may be configured to receive data in accordance with a broadcast or multicast network protocol, such as eMBMS or IP multicast. In such examples, retrieval unit 52 may submit a request to join a multicast network group associated with particular media content. After joining the multicast group, retrieval unit 52 may receive data of the multicast group without further requests issued to server device 60 or content preparation device 20. Retrieval unit 52 may submit a request to leave the multicast group when data of the multicast group is no longer needed, e.g., to stop playback or to change channels to a different multicast group.

Network interface 54 may receive and provide data of segments of a selected representation to retrieval unit 52, which may in turn provide the segments to decapsulation unit 50. Decapsulation unit 50 may decapsulate elements of a video file into constituent PES streams, depacketize the PES streams to retrieve encoded data, and send the encoded data to either audio decoder 46 or video decoder 48, depending on whether the encoded data is part of an audio or video stream, e.g., as indicated by PES packet headers of the stream. Audio decoder 46 decodes encoded audio data and sends the decoded audio data to audio output 42, while video decoder 48 decodes encoded video data and sends the decoded video data, which may include a plurality of views of a stream, to video output 44.

Video encoder 28, video decoder 48, audio encoder 26, audio decoder 46, encapsulation unit 30, retrieval unit 52, and decapsulation unit 50 each may be implemented as any of a variety of suitable processing circuitry, as applicable, such as one or more microprocessors, digital signal processors (DSPs), application specific integrated circuits (ASICs), field programmable gate arrays (FPGAs), discrete logic circuitry, software, hardware, firmware or any combinations thereof. Each of video encoder 28 and video decoder 48 may be included in one or more encoders or decoders, either of which may be integrated as part of a combined video encoder/decoder (CODEC). Likewise, each of audio encoder 26 and audio decoder 46 may be included in one or more encoders or decoders, either of which may be integrated as part of a combined CODEC. An apparatus including video encoder 28, video decoder 48, audio encoder 26, audio decoder 46, encapsulation unit 30, retrieval unit 52, and/or decapsulation unit 50 may comprise an integrated circuit, a microprocessor, and/or a wireless communication device, such as a cellular telephone.

Client device 40, server device 60, and/or content preparation device 20 may be configured to operate in accordance with the techniques of this disclosure. For purposes of example, this disclosure describes these techniques with respect to client device 40 and server device 60. However, it should be understood that content preparation device 20 may be configured to perform these techniques, instead of (or in addition to) server device 60.

Encapsulation unit 30 may form NAL units comprising a header that identifies a program to which the NAL unit belongs, as well as a payload, e.g., audio data, video data, or data that describes the transport or program stream to which the NAL unit corresponds. For example, in H.264/AVC, a NAL unit includes a 1-byte header and a payload of varying size. A NAL unit including video data in its payload may comprise various granularity levels of video data. For example, a NAL unit may comprise a block of video data, a plurality of blocks, a slice of video data, or an entire picture of video data. Encapsulation unit 30 may receive encoded video data from video encoder 28 in the form of PES packets of elementary streams. Encapsulation unit 30 may associate each elementary stream with a corresponding program.

Encapsulation unit 30 may also assemble access units from a plurality of NAL units. In general, an access unit may comprise one or more NAL units for representing a frame of video data, as well audio data corresponding to the frame when such audio data is available. An access unit generally includes all NAL units for one output time instance, e.g., all audio and video data for one time instance. For example, if each view has a frame rate of 20 frames per second (fps), then each time instance may correspond to a time interval of 0.05 seconds. During this time interval, the specific frames for all views of the same access unit (the same time instance) may be rendered simultaneously. In one example, an access unit may comprise a coded picture in one time instance, which may be presented as a primary coded picture.

Accordingly, an access unit may comprise all audio and video frames of a common temporal instance, e.g., all views corresponding to time X. This disclosure also refers to an encoded picture of a particular view as a "view component." That is, a view component may comprise an encoded picture (or frame) for a particular view at a particular time. Accordingly, an access unit may be defined as comprising all view components of a common temporal instance. The decoding order of access units need not necessarily be the same as the output or display order.

A media presentation may include a media presentation description (MPD), which may contain descriptions of different alternative representations (e.g., video services with different qualities) and the description may include, e.g., codec information, a profile value, and a level value. An MPD is one example of a manifest file, such as manifest file 66. Client device 40 may retrieve the MPD of a media presentation to determine how to access movie fragments of various presentations. Movie fragments may be located in movie fragment boxes (moof boxes) of video files.

Manifest file 66 (which may comprise, for example, an MPD) may advertise availability of segments of representations 68. That is, the MPD may include information indicating the wall-clock time at which a first segment of one of representations 68 becomes available, as well as information indicating the durations of segments within representations 68. In this manner, retrieval unit 52 of client device 40 may determine when each segment is available, based on the starting time as well as the durations of the segments preceding a particular segment.

After encapsulation unit 30 has assembled NAL units and/or access units into a video file based on received data, encapsulation unit 30 passes the video file to output interface 32 for output. In some examples, encapsulation unit 30 may store the video file locally or send the video file to a remote server via output interface 32, rather than sending the video file directly to client device 40. Output interface 32 may comprise, for example, a transmitter, a transceiver, a device for writing data to a computer-readable medium such as, for example, an optical drive, a magnetic media drive (e.g., floppy drive), a universal serial bus (USB) port, a network interface, or other output interface. Output interface 32 outputs the video file to a computer-readable medium, such as, for example, a transmission signal, a magnetic medium, an optical medium, a memory, a flash drive, or other computer-readable medium.

Network interface 54 may receive a NAL unit or access unit via network 74 and provide the NAL unit or access unit to decapsulation unit 50, via retrieval unit 52. Decapsulation unit 50 may decapsulate a elements of a video file into constituent PES streams, depacketize the PES streams to retrieve encoded data, and send the encoded data to either audio decoder 46 or video decoder 48, depending on whether the encoded data is part of an audio or video stream, e.g., as indicated by PES packet headers of the stream. Audio decoder 46 decodes encoded audio data and sends the decoded audio data to audio output 42, while video decoder 48 decodes encoded video data and sends the decoded video data, which may include a plurality of views of a stream, to video output 44.

Figure 2:
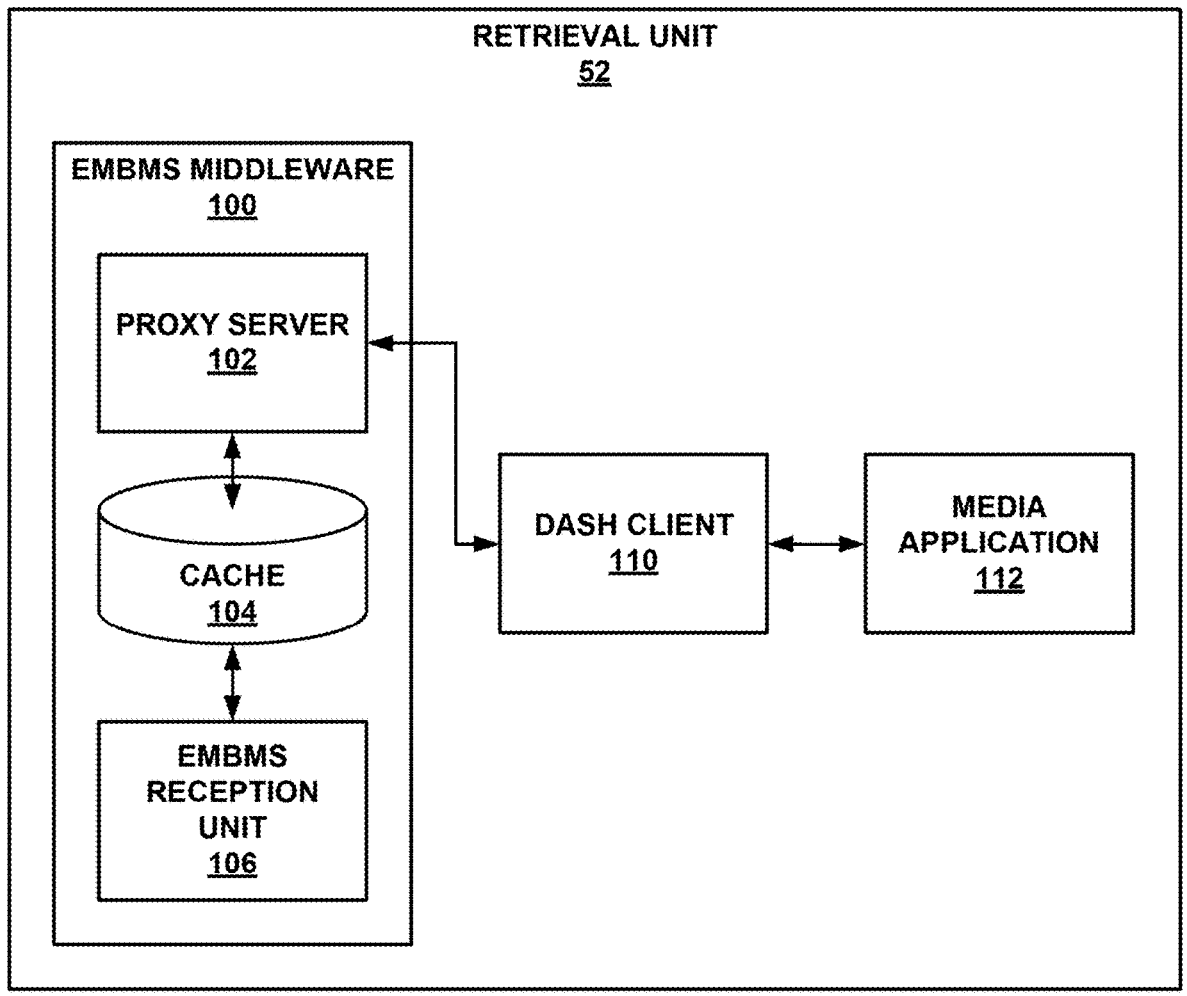
FIG. 2 is a block diagram illustrating an example set of components of a retrieval unit.

FIG. 2 is a block diagram illustrating an example set of components of retrieval unit 52 of FIG. 1 in greater detail. In this example, retrieval unit 52 includes eMBMS middleware unit 100, DASH client 110, and media application 112.

In this example, eMBMS middleware unit 100 further includes eMBMS reception unit 106, cache 104, and proxy server unit 102. In this example, eMBMS reception unit 106 is configured to receive data via eMBMS, e.g., according to File Delivery over Unidirectional Transport (FLUTE), described in T. Paila et al., "FLUTE—File Delivery over Unidirectional Transport," Network Working Group, RFC 6726, November 2012, available at http://tools.ietf.org/html/rfc6726. That is, eMBMS reception unit 106 may receive files via broadcast from, e.g., server device 60, which may act as a broadcast/multicast service center (BM-SC).

As eMBMS middleware unit 100 receives data for files, eMBMS middleware unit may store the received data in cache 104. Cache 104 may comprise a computer-readable storage medium, such as flash memory, a hard disk, RAM, or any other suitable storage medium.

Proxy server unit 102 may act as a server for DASH client 110. For example, proxy server unit 102 may provide a MPD file or other manifest file to DASH client 110. Proxy server unit 102 may advertise availability times for segments in the MPD file, as well as hyperlinks from which the segments can be retrieved. These hyperlinks may include a localhost address prefix corresponding to client device 40 (e.g., 127.0.0.1 for IPv4). In this manner, DASH client 110 may request segments from proxy server unit 102 using HTTP GET or partial GET requests. For example, for a segment available from link http://127.0.0.1/rep1/seg3, DASH client 110 may construct an HTTP GET request that includes a request for http://127.0.0.1/rep1/seg3, and submit the request to proxy server unit 102. Proxy server unit 102 may retrieve requested data from cache 104 and provide the data to DASH client 110 in response to such requests.

In accordance with the techniques of this disclosure, media application 112 may subscribe to interactivity events with DASH client 110. DASH client 110 may then deliver subscribed interactivity events to media application 112. In accordance with the techniques of this disclosure, it is assumed that media application 112 is configured to present interactivity events.

In accordance with the techniques of this disclosure, DASH client 110 and media application 112 may process data using a DASH inband event messaging mechanism, such as an event message (EMSG) box. DASH client 110 may operate according to the example processing model of the events discussed below. The mechanisms discussed below may also hold for manifest file events, such as MPD events, which may carry the same or similar parameters.

DASH events are described in ISO/IEC 23009-1:2017: Information technology—Dynamic adaptive streaming over HTTP (DASH)—Part 1: Media presentation description and segment formats, 2017, as follows:

Event streams may be multiplexed with Representations by adding the event messages as part of the Segments. The event streams may be present in selected Representations, in one or several selected Adaptation Set only or in all Representations. For example, one possible configuration is one where only the audio Adaptation Sets may contain inband events.

In order to identify the Representations that carry the event stream, the presence of Events shall be signalled in the MPD as defined in 5.10.3.2 of [1].

If more than one Representation carries event streams with same @schemeIdUri and the same @value, the streams shall be semantically equivalent, i.e. processing of one Representation is sufficient.

The format of the box to signal events in the media stream is provided in 5.10.3.3 of ISO/IEC 23009-1.

An inband event stream that is present in a Representation may be indicated by an InbandEventStream element on an adaptation set or representation level. An example InbandEventStream type is defined in 5.10.2, Table 24, of ISO/IEC 23009-1. One Representation may contain multiple inband Event streams, each indicated by a separate InbandEventStream element.

The Event Message box ('emsg') may provide signaling for generic events related to a media presentation time. The same semantics as for an event defined in the MPD specified in 5.10.2 of ISO/IEC 23009-1 may apply to the emsg box. The Event Message box ('emsg') may also provide signaling data that is specific to DASH operations. The event scheme identifier and the events may be the same as defined in 5.10.4 of ISO/IEC 23009-1.

A Media Segment, if encapsulated in ISO BMFF, may contain one or more event message ('emsg') boxes. If present, any 'emsg' box may be placed before any 'moof' box.

An example carriage of event messages in the MPEG-2 TS is described in 5.10.3.3.5 of ISO/IEC 23009-1.

Event message boxes with scheme identifiers that are not defined in the MPD should not be present. If DASH client 110 detects an event message box with a scheme that is not defined in MPD, DASH client 110 may ignore the event message box.

In accordance with the techniques of this disclosure, in one example, DASH client 110 may perform the following processing model for event messages related to interactivity events. If DASH client 110 is informed to provide events to media application 112 based on, e.g., schemeIdUri/value pair, DASH client 110 may act as follows:

1. DASH client 110 parses the Representation that contains Events.
2. When DASH client 110 detects an Event that matches the schemeIdUri/value of interest, and assuming the use of inband Events, then DASH client 110 may act as follows:

i. Parse the event message box;

ii. Determine the derived start time of the Event by media presentation time (i.e., as represented by the value of presentation_time, or computed from the value of presentation_time_delta, whichever parameter appears inside 'emsg');

iii. If the current media presentation time is smaller than the Event's derived start time as indicated in 'emsg', DASH client 110 may perform one of the three actions indicated below:

(a) Dispatch the Event's id and message_data fields immediately to the media application 112 and include either 1) the time to the Event's derived start time, or 2) the current media time of this dispatch and the Event's derived start time. Additionally, the Event duration may be provided;

(b) Store the Event (e.g., in cache 104) and dispatch the Event's id and message_data fields to media application 112, at the precise moment that the media presentation time matches the Event's derived start time; or (b) Dispatch the Event's id and message_data fields immediately to the media application 112 and include either 1) the time to the Event's derived start time, or 2) the current media time of this dispatch and the Event's derived start time. Additionally, the Event duration may be provided; or (c) Dispatch the Event's id along with message_data fields at a later time on the media presentation timeline but which is still prior to the Event's derive start time, and include either 1) the time to Event start, or 2) the current media time of this dispatch and the Event's derived start time. Additionally, the Event duration may be provided.

iv. If the current media presentation time is larger than or equal to the Event's derived start time, but smaller than the [derived Event start time+event_duration], and the Event information (as described in step iii) has not yet been sent to media application 112, DASH client 110 may immediately dispatch that Event information, along with the value of the current media presentation time and the Event's derived start time, to media application 112;

v. If the currently presented media time is larger than or equal to the [Event's derived start time+event_duration], DASH client 110 may ignore the event message box.

Otherwise, DASH client 110 ignores the event message box.

Additionally, upon the occurrence of eithers steps iii or iv as described above, the DASH client 110 may send an "event-start" notification to the media application 112 at the precise moment of the Event's derived start time, as well as an "event-end" notification to the media application 112 at the precise moment of the Event's expiry (as given by [Event's derived start time+event_duration]).

DASH client 110 may be configured to perform one of the two example techniques described below, as also introduced above, or other similar techniques. In the first example technique, DASH client 110 sends media application 112 information contained in an id and message_data fields of the 'emsg' box. Additionally, DASH client 110 may also send event_duration and timescale information to media application 112, to inform the media application 112 of the Event's duration in media time. Additionally or alternatively, DASH client 110 may convert the Event duration information contained in 'emsg' from media time to a quantity in whole plus fractional seconds, then provide that information to media application 112. In both options, media application 112 is assumed to have access to a system clock of known frequency to determine Event expiry.

Further, in the first example technique, media application 112 may be configured to determine that the start of an interactivity window or an interactivity event coincides with the time of reception of Event information. Media application 112 may identify interactivity logic to run (by id and possibly supplemented by information in the message_data parameter from the 'emsg' box received from DASH client 110). Media application 112 may then activate the interactivity window or the interactivity event for a validity period as indicated by the Event information (which media application 112 may have computed or received from DASH client 110).

Figure 3:
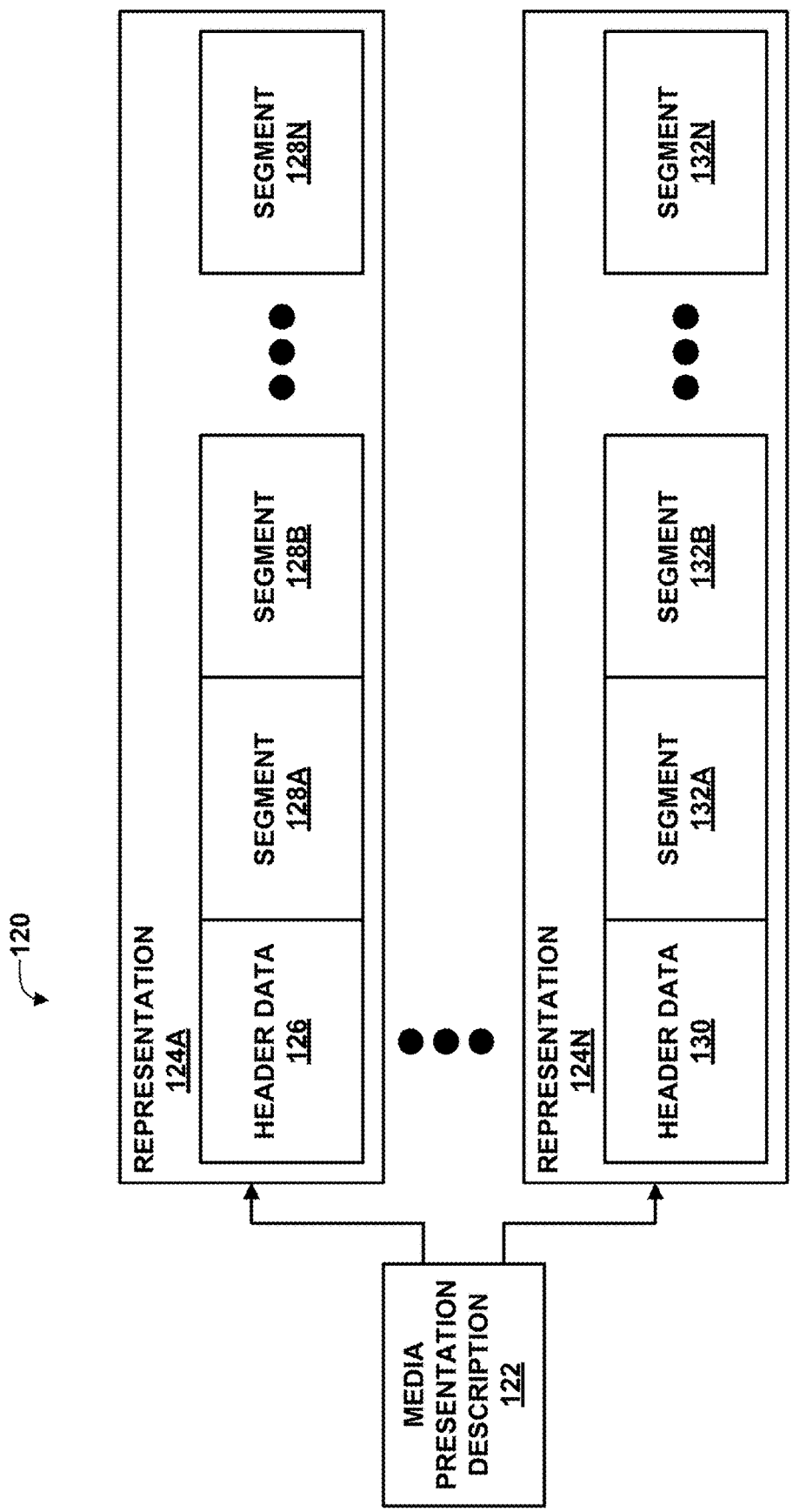
FIG. 3 is a conceptual diagram illustrating elements of example multimedia content.

FIG. 3 is a conceptual diagram illustrating elements of example multimedia content 120. Multimedia content 120 may correspond to multimedia content 64 (FIG. 1), or another multimedia content stored in storage medium 62. In the example of FIG. 3, multimedia content 120 includes media presentation description (MPD) 122 and a plurality of representations 124A-124N (representations 124). Representation 124A includes optional header data 126 and segments 128A-128N (segments 128), while representation 124N includes optional header data 130 and segments 132A-132N (segments 132). The letter N is used to designate the last movie fragment in each of representations 124 as a matter of convenience. In some examples, there may be different numbers of movie fragments between representations 124.

MPD 122 may comprise a data structure separate from representations 124. MPD 122 may correspond to manifest file 66 of FIG. 1. Likewise, representations 124 may correspond to representations 68 of FIG. 1. In general, MPD 122 may include data that generally describes characteristics of representations 124, such as coding and rendering characteristics, adaptation sets, a profile to which MPD 122 corresponds, text type information, camera angle information, rating information, trick mode information (e.g., information indicative of representations that include temporal sub-sequences), and/or information for retrieving remote periods (e.g., for targeted advertisement insertion into media content during playback).

Header data 126, when present, may describe characteristics of segments 128, e.g., temporal locations of random access points (RAPs, also referred to as stream access points (SAPs)), which of segments 128 includes random access points, byte offsets to random access points within segments 128, uniform resource locators (URLs) of segments 128, or other aspects of segments 128. Header data 130, when present, may describe similar characteristics for segments 132. Additionally or alternatively, such characteristics may be fully included within MPD 122.

Segments 128, 132 include one or more coded video samples, each of which may include frames or slices of video data. Each of the coded video samples of segments 128 may have similar characteristics, e.g., height, width, and bandwidth requirements. Such characteristics may be described by data of MPD 122, though such data is not illustrated in the example of FIG. 3. MPD 122 may include characteristics as described by the 3GPP Specification, with the addition of any or all of the signaled information described in this disclosure.

Each of segments 128, 132 may be associated with a unique uniform resource locator (URL). Thus, each of segments 128, 132 may be independently retrievable using a streaming network protocol, such as DASH. In this manner, a destination device, such as client device 40, may use an HTTP GET request to retrieve segments 128 or 132. In some examples, client device 40 may use HTTP partial GET requests to retrieve specific byte ranges of segments 128 or 132.

Figure 4:
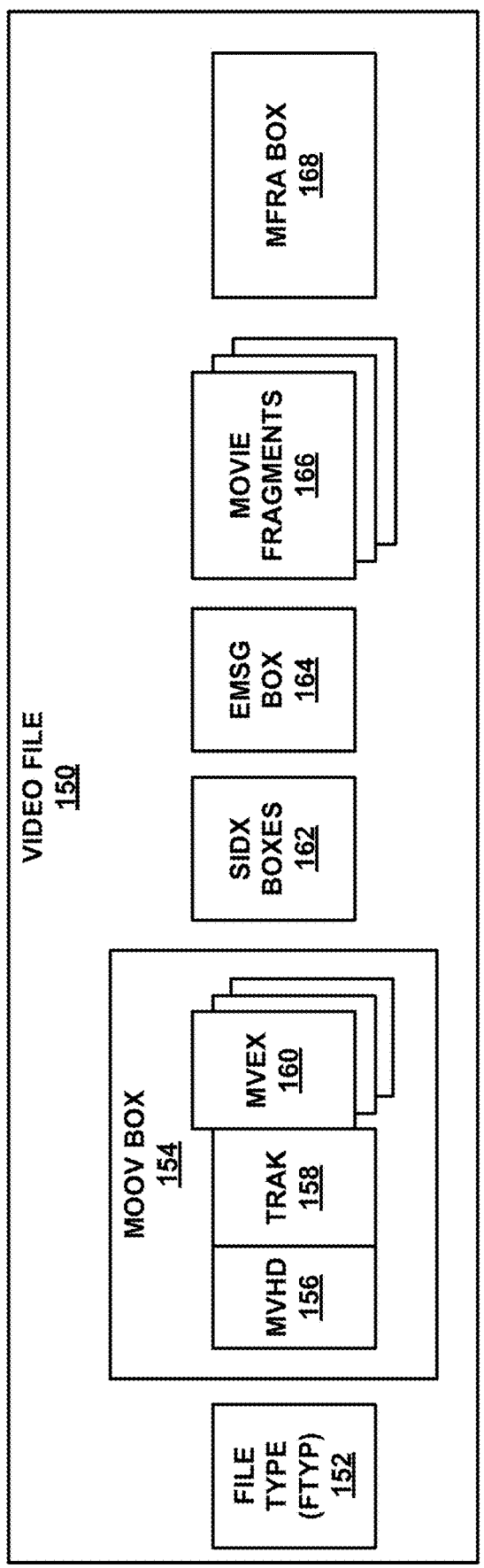
FIG. 4 is a block diagram illustrating elements of an example video file, which may correspond to a segment of a representation.

FIG. 4 is a block diagram illustrating elements of an example video file 150, which may correspond to a segment of a representation, such as one of segments 128, 132 of FIG. 3. Each of segments 128, 132 may include data that conforms substantially to the arrangement of data illustrated in the example of FIG. 4. Video file 150 may be said to encapsulate a segment. As described above, video files in accordance with the ISO base media file format and extensions thereof store data in a series of objects, referred to as "boxes." In the example of FIG. 4, video file 150 includes file type (FTYP) box 152, movie (MOOV) box 154, segment index (sidx) boxes 162, movie fragment (MOOF) boxes 166, and movie fragment random access (MFRA) box 168. Although FIG. 4 represents an example of a video file, it should be understood that other media files may include other types of media data (e.g., audio data, timed text data, or the like) that is structured similarly to the data of video file 150, in accordance with the ISO base media file format and its extensions.

File type (FTYP) box 152 generally describes a file type for video file 150. File type box 152 may include data that identifies a specification that describes a best use for video file 150. File type box 152 may alternatively be placed before MOOV box 154, movie fragment boxes 166, and/or MFRA box 168.

In some examples, a Segment, such as video file 150, may include an MPD update box (not shown) before FTYP box 152. The MPD update box may include information indicating that an MPD corresponding to a representation including video file 150 is to be updated, along with information for updating the MPD. For example, the MPD update box may provide a URI or URL for a resource to be used to update the MPD. As another example, the MPD update box may include data for updating the MPD. In some examples, the MPD update box may immediately follow a segment type (STYP) box (not shown) of video file 150, where the STYP box may define a segment type for video file 150.

MOOV box 154, in the example of FIG. 4, includes movie header (MVHD) box 156, track (TRAK) box 158, and one or more movie extends (MVEX) boxes 160. In general, MVHD box 156 may describe general characteristics of video file 150. For example, MVHD box 156 may include data that describes when video file 150 was originally created, when video file 150 was last modified, a timescale for video file 150, a duration of playback for video file 150, or other data that generally describes video file 150.

TRAK box 158 may include data for a track of video file 150. TRAK box 158 may include a track header (TKHD) box that describes characteristics of the track corresponding to TRAK box 158. In some examples, TRAK box 158 may include coded video pictures, while in other examples, the coded video pictures of the track may be included in movie fragments 166, which may be referenced by data of TRAK box 158 and/or sidx boxes 162.

In some examples, video file 150 may include more than one track. Accordingly, MOOV box 154 may include a number of TRAK boxes equal to the number of tracks in video file 150. TRAK box 158 may describe characteristics of a corresponding track of video file 150. For example, TRAK box 158 may describe temporal and/or spatial information for the corresponding track. A TRAK box similar to TRAK box 158 of MOOV box 154 may describe characteristics of a parameter set track, when encapsulation unit 30 (FIG. 3) includes a parameter set track in a video file, such as video file 150. Encapsulation unit 30 may signal the presence of sequence level SEI messages in the parameter set track within the TRAK box describing the parameter set track.

MVEX boxes 160 may describe characteristics of corresponding movie fragments 166, e.g., to signal that video file 150 includes movie fragments 166, in addition to video data included within MOOV box 154, if any. In the context of streaming video data, coded video pictures may be included in movie fragments 166 rather than in MOOV box 154. Accordingly, all coded video samples may be included in movie fragments 166, rather than in MOOV box 154.

MOOV box 154 may include a number of MVEX boxes 160 equal to the number of movie fragments 166 in video file 150. Each of MVEX boxes 160 may describe characteristics of a corresponding one of movie fragments 166. For example, each MVEX box may include a movie extends header box (MEHD) box that describes a temporal duration for the corresponding one of movie fragments 166.

As noted above, encapsulation unit 30 may store a sequence data set in a video sample that does not include actual coded video data. A video sample may generally correspond to an access unit, which is a representation of a coded picture at a specific time instance. In the context of AVC, the coded picture include one or more VCL NAL units which contains the information to construct all the pixels of the access unit and other associated non-VCL NAL units, such as SEI messages. Accordingly, encapsulation unit 30 may include a sequence data set, which may include sequence level SEI messages, in one of movie fragments 166. Encapsulation unit 30 may further signal the presence of a sequence data set and/or sequence level SEI messages as being present in one of movie fragments 166 within the one of MVEX boxes 160 corresponding to the one of movie fragments 166.

SIDX boxes 162 are optional elements of video file 150. That is, video files conforming to the 3GPP file format, or other such file formats, do not necessarily include SIDX boxes 162. In accordance with the example of the 3GPP file format, a SIDX box may be used to identify a sub-segment of a segment (e.g., a segment contained within video file 150). The 3GPP file format defines a sub-segment as "a self-contained set of one or more consecutive movie fragment boxes with corresponding Media Data box(es) and a Media Data Box containing data referenced by a Movie Fragment Box must follow that Movie Fragment box and precede the next Movie Fragment box containing information about the same track." The 3GPP file format also indicates that a SIDX box "contains a sequence of references to subsegments of the (sub)segment documented by the box. The referenced subsegments are contiguous in presentation time. Similarly, the bytes referred to by a Segment Index box are always contiguous within the segment. The referenced size gives the count of the number of bytes in the material referenced."

SIDX boxes 162 generally provide information representative of one or more sub-segments of a segment included in video file 150. For instance, such information may include playback times at which sub-segments begin and/or end, byte offsets for the sub-segments, whether the sub-segments include (e.g., start with) a stream access point (SAP), a type for the SAP (e.g., whether the SAP is an instantaneous decoder refresh (IDR) picture, a clean random access (CRA) picture, a broken link access (BLA) picture, or the like), a position of the SAP (in terms of playback time and/or byte offset) in the sub-segment, and the like.

Movie fragments 166 may include one or more coded video pictures. In some examples, movie fragments 166 may include one or more groups of pictures (GOPs), each of which may include a number of coded video pictures, e.g., frames or pictures. In addition, as described above, movie fragments 166 may include sequence data sets in some examples. Each of movie fragments 166 may include a movie fragment header box (MFHD, not shown in FIG. 4). The MFHD box may describe characteristics of the corresponding movie fragment, such as a sequence number for the movie fragment. Movie fragments 166 may be included in order of sequence number in video file 150.

MFRA box 168 may describe random access points within movie fragments 166 of video file 150. This may assist with performing trick modes, such as performing seeks to particular temporal locations (i.e., playback times) within a segment encapsulated by video file 150. MFRA box 168 is generally optional and need not be included in video files, in some examples. Likewise, a client device, such as client device 40, does not necessarily need to reference MFRA box 168 to correctly decode and display video data of video file 150. MFRA box 168 may include a number of track fragment random access (TFRA) boxes (not shown) equal to the number of tracks of video file 150, or in some examples, equal to the number of media tracks (e.g., non-hint tracks) of video file 150.

In some examples, movie fragments 166 may include one or more stream access points (SAPs), such as IDR pictures. Likewise, MFRA box 168 may provide indications of locations within video file 150 of the SAPs. Accordingly, a temporal sub-sequence of video file 150 may be formed from SAPs of video file 150. The temporal sub-sequence may also include other pictures, such as P-frames and/or B-frames that depend from SAPs. Frames and/or slices of the temporal sub-sequence may be arranged within the segments such that frames/slices of the temporal sub-sequence that depend on other frames/slices of the sub-sequence can be properly decoded. For example, in the hierarchical arrangement of data, data used for prediction for other data may also be included in the temporal sub-sequence.

In accordance with the techniques of this disclosure, video file 150 further includes event message (EMSG) box 164. EMSG box 164 generally includes data representative of one or more interactivity events as discussed above. EMSG box 164 may have the following definition and syntax, in one example:

| Box Type: | 'emsg' |
|---|---|
| Container: | Segment |
| Mandatory: | No |

```
Quantity:                    Zero or more
aligned(8) class DASHEventMessageBox extends FullBox('emsg',
version = 0, flags = 0){
    string                   scheme_id_uri;
    string                   value;
    unsigned int(32) timescale;
    unsigned int(32) presentation_time_delta;
    unsigned int(32) event_duration;
    unsigned int(32) id;
    unsigned int(8) message_data[ ];
  }
}
``` scheme_id_uri may identify the message scheme. The semantics and syntax of the message_data[ ] may be defined by the owner of the scheme identified. The string may use URN or URL syntax. When a URL is used, it is recommended to also contain a month-date in the form mmyyyy; the assignment of the URL must have been authorized by the owner of the domain name in that URL on or very close to that date. A URL may resolve to an Internet location, and a location that does resolve may store a specification of the message scheme.

Value may specify the value for the event. The value space and semantics may be defined by the owners of the scheme identified in the scheme_id_uri field.

Timescale may provide the timescale, in ticks per second, for the time and duration fields within this box;

Presentation_time_delta may provide the time difference between the media presentation time of the event and the earliest presentation time in this segment. If the segment index is present, then the earliest presentation time may be determined by the field earliest_presentation_time of the first 'sidx' box. If the segment index is not present, the earliest presentation time may be determined as the earliest presentation time of any access unit in the media segment. The timescale may be provided in the timescale field.

Event_duration may provide the duration of event in media presentation time. The timescale may be indicated in the timescale field. The value 0xFFFF may indicate an unknown duration.

Id may be a field identifying this instance of the message. Messages with equivalent semantics may have the same value, i.e., processing of any one event message box with the same id may be sufficient.

Message_data may include the body of the message, which may fill the remainder of the message box. This may be empty, depending on the above information. The syntax and semantics of this field may be defined by the owner of the scheme identified in the scheme_id_uri field.

In another example, the emsg box may have the following syntax, with semantics similar to the above for version 0, and as discussed below for version 1:

```
Box Type:       'emsg'
Container:      Segment
Mandatory:      No
Quantity:       Zero or more
aligned(8) class DASHEventMessageBox extends FullBox('emsg',
version, flags = 0){
    if (version==0) {
            string              scheme_id_uri;
            string              value;
            unsigned int(32)    timescale;
            unsigned int(32)    presentation_time_delta;
            unsigned int(32)    event_duration;
            unsigned int(32)    id;
```
```
    } else if (version==1) {
            unsigned int(32)    timescale;
            unsigned int(64)    presentation_time;
            unsigned int(32)    event_duration;
            unsigned int(32)    id;
            string              scheme_id_uri;
            string              value;
    }
    unsigned int(8) message_data[ ];
}
```

Media application 112 may subscribe to an event type indicated by scheme_id_uri and value of the emsg box. In accordance with the first example method discussed above, when DASH client 110 receives an emsg box including a scheme_id_uri and value corresponding to the subscription from media application 112, DASH client 110 may deliver the id and message_data[ ] information in the emsg box to media application 112. In particular, DASH client 110 may process each of the timescale, presentation_time, and event_duration values to determine whether and when to dispatch Event information (e.g., at least id and message_data) to media application 112. In one example, DASH client 110 additionally sends timescale and event_duration data to media application 112. In another example, DASH client 110 computes an event duration in elapsed time from timescale and event_duration, and sends that information to media application 112.

In some examples, server device 60 or another device may dynamically or abruptly terminate an ongoing event by sending a second Event message with the same id value but a null duration (i.e., null value for the event_duration field) to DASH client 110.

In accordance with the second example technique discussed above, DASH client 110, at the exact instant that current media time equals the Event start time, only sends information contained in the id and message_data fields of 'emsg' to media application 112. That is, DASH client 110 may abstain from sending timing information related fields of the emsg box discussed above to media application 112. Actual Event duration information may be assumed to be embedded in the message_data field. In the absence of current media time information provided by the DASH client 110, the media application 112 assumes that Event start coincides with the time of reception of Event information from the DASH client 112, Media application 112 may be assumed to have access to a system clock to determine Event expiration. A difference between the second example technique and the first example technique is that there is a logical separation in processing between DASH client 110 and media application 112 of data intrinsically targeted to each entity.

As in the first example technique, media application 112 considers the start of an interactivity window to coincide with the time of its reception of event information. Also as in the first example technique, media application 112 may identify interactivity logic to run according to the id value, possibly supplemented by information of the message_data parameter, with the resulting activation of the interactivity window/interactivity event with a validity period given by the Event duration, conveyed within the message_data field.

In the second example technique, DASH client 110 processes timescale, presentation_time, and event_duration values of the emsg box discussed above to determine whether and when to dispatch event information (id and message_data) to media application 112. As in the first example technique, source device 60 or another device may dynamically or abruptly terminate an ongoing event by sending a second Event message with the same id value but a null duration value to DASH client 110.

Figure 5:
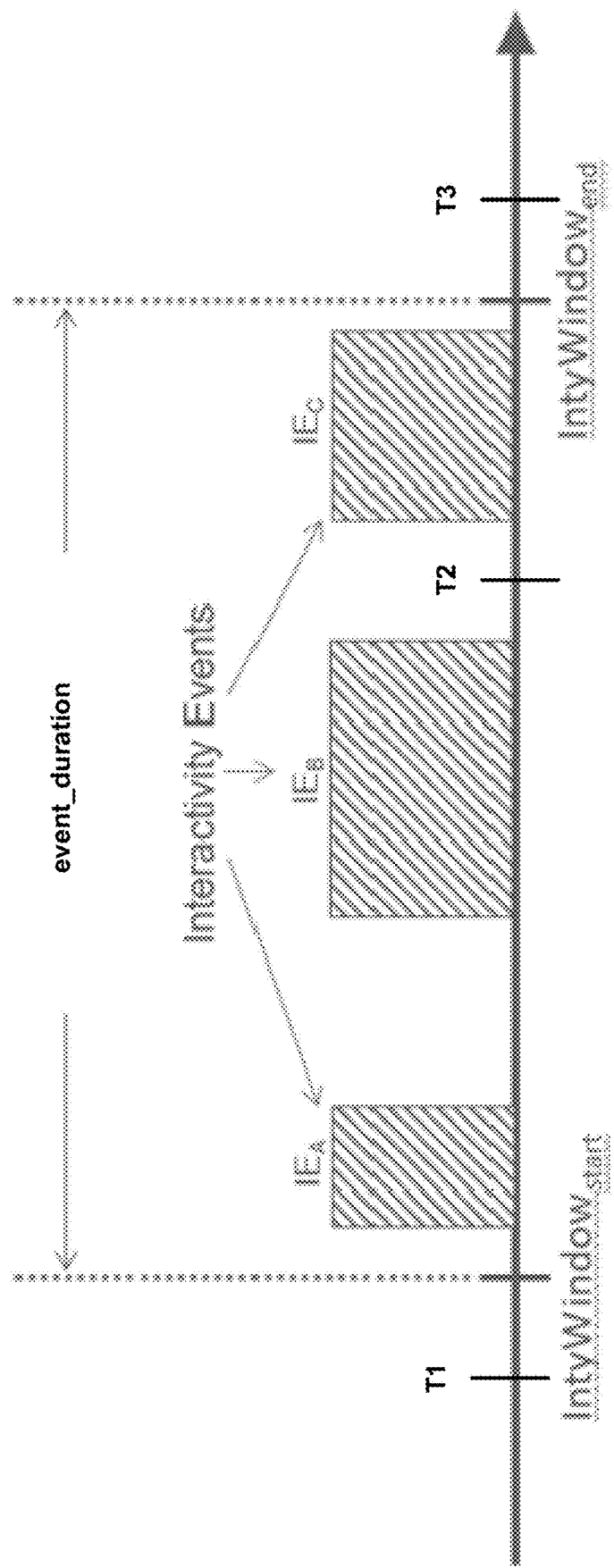
FIG. 5 is a conceptual diagram illustrating an example interactivity window according to examples of the techniques of this disclosure.

FIG. 5 is a conceptual diagram illustrating an example interactivity window according to examples of the techniques of this disclosure. The interactivity window has a start time (IntyWindowstart) and an end time (IntyWindoWend), and whereby the difference between the interactivity window start and end times is given by the value of the event_duration field. The occurrences of interactivity events, such as $IE_A$, $IE_B$, and $IE_C$ result from the execution of the interactivity logic by the application. During each of the interactivity events, interactive content or UI controls may be displayed along with the main program to enable interactive user engagement.

The following terms, definitions, and operating assumptions may apply for an instance of an interactivity window, within which one or more interactivity events may occur, as shown in the example of FIG. 5, as defined by interactivity logic. Interactivity Window start time, $IntyWindow_{start}$, may coincide with the instant media application 112 receives Event info (at least id, message_data) from DASH client 110. DASH client 110 may dispatch Event information to media application 112 when a current media presentation time is the same as the Event start time (e.g., presentation_time). A delay between sending time from DASH client 110 to reception time at media application 112 of event information (e.g., in milliseconds) is typically negligible relative to the time scale of the interactivity event (e.g., in tens of seconds). The interactivity window end time, $IntyWindow_{end}$, may be given by [$IntyWindow_{start}$+Event duration]. Media application 112 executing interactivity logic is assumed to have access to a stable clock reference for determining $IntyWindow_{end}$. An interactivity event, IntyEvent, represents an interval during which interactive content and/or user interface (UI) controls are presented to the user, enabling corresponding user engagement. Interactivity logic may dictate whether an ongoing IntyEvent is allowed to extend into the next IntyEvent, if present, within the interactivity window, and possibly suppress the occurrence of the latter interactivity event. It may be possible for an active interactivity window to be interrupted and terminated when media application 112 receives new Event info with the same id. For example, a content service provider (e.g., content preparation device 20 and/or source device 60 of FIG. 1) may dynamically terminate a program break to resume main program play-out.

In one example, if DASH client 110 receives an interactivity-related DASH Event at a current media presentation time (e.g., at time T1) earlier than the indicative Event start time as represented by presentation_time, or as derived from presentation_time_delta, then DASH client 110 may store the Event and dispatch the Event's id, message data, and event duration to media application 112 at the moment that the current media presentation time matches the Event's start time or derived start time.

In another example, if DASH client 110 receives an interactivity-related DASH Event at a current media presentation time (e.g., at time T2) later than the indicative Event start time as represented by presentation_time, or as derived from presentation_time_delta, but earlier than the indicative Event start time plus its duration, then DASH client 110 may immediately dispatch the Event's id, message data, and event duration to media application 112.

In another example, if DASH client 110 receives an interactivity-related DASH event at a current media presentation time (e.g., at time T3) that is later than the indicative Event start time as represented by presentation_time, or as derived from presentation_time_delta, plus the Event's duration, then DASH client 110 may abstain from forwarding information contained in that Event to media application 112.

In this manner, service interactivity during a main program may be defined by one or more instances of Interactivity Windows, each of which may contain one or more Interactivity Events. Each Interactivity Window may have a well-defined start and end time, $IntyWindow_{start}$ and $IntyWindow_{end}$, respectively. In one example, $IntyWindow_{start}$ is the precise instant at which media application 112 receives event info dispatched by DASH client 110, and $IntyWindow_{end}$ is derived according to [$IntyWindow_{start}$+event_duration]. When DASH client 110 receives an Event of interest (matching schemeIdUri and value as subscribed by App), DASH client 110 may dispatch information contained in that Event to media application 112, as long as the current media presentation time is earlier than the indicative Event start time+event_duration (equivalent to expiration of the Interactivity Window from the perspective of media application 112).

Figure 6A:
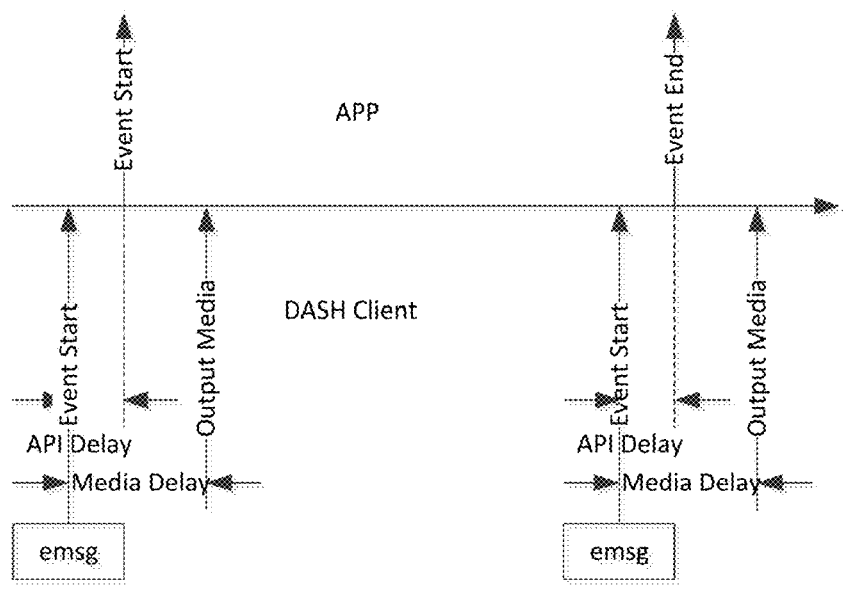
FIGS. 6A-6C are flow diagrams depicting example timeline considerations according to various examples of the techniques of this disclosure.
Figure 6B:
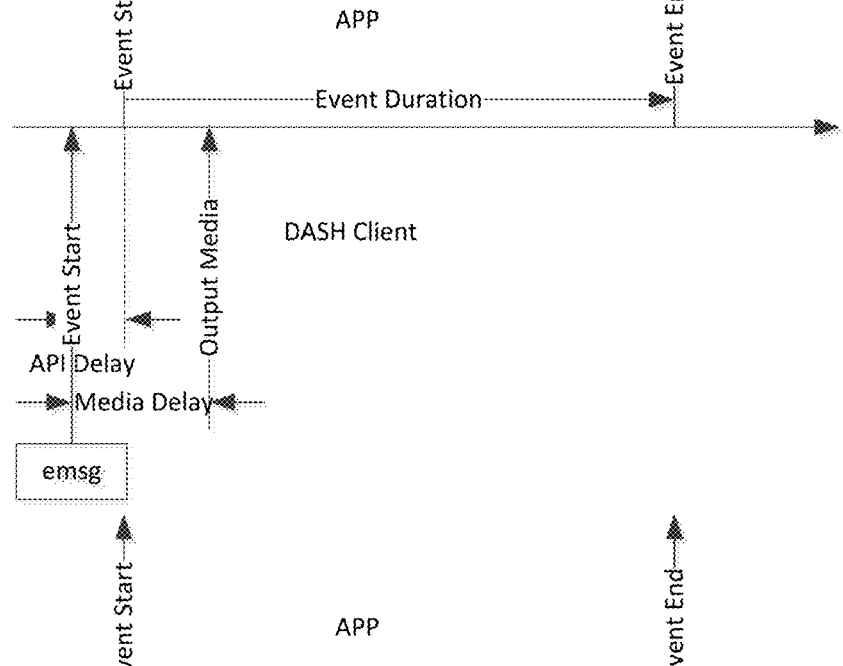
Figure 6C:
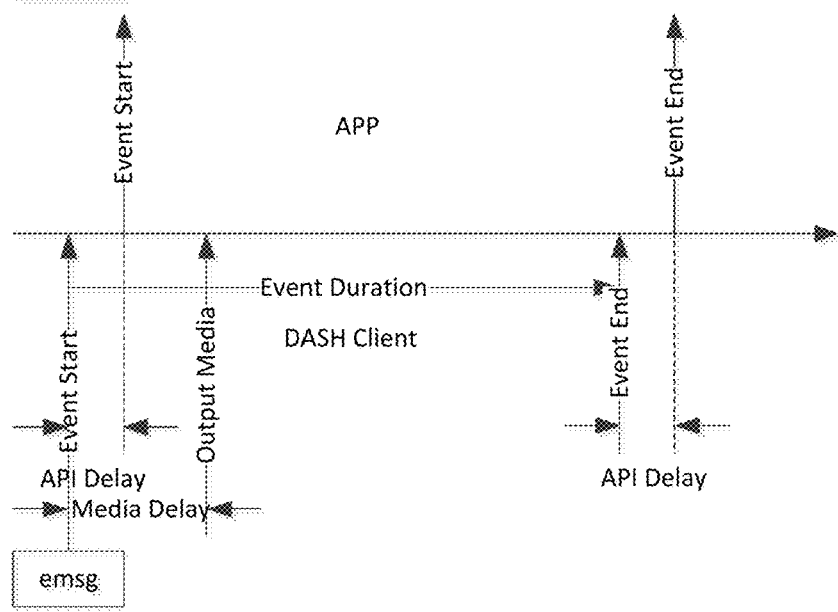

FIGS. 6A-6C are flow diagrams depicting example timeline considerations according to various examples of the techniques of this disclosure. In FIG. 6A, a DASH server (e.g., server device 60 of FIG. 1) sends messages to start and end an Event. A DASH client (e.g., DASH client 110 (FIG. 2) of retrieval unit 52 (FIGS. 1 and 2)) delivers notifications to a media application (e.g., media application 112 of FIG. 2).

In FIG. 6B, the DASH client (e.g., DASH client 110 of FIG. 2) sends an event description to media application 112. DASH client 110 may deliver an Event description to media application 112. Media application 112 may manage time from receipt. This example may ensure a smooth end point for the event duration.

In FIG. 6C, the DASH client receives an Event description and manages media application 112. In this example, the DASH client does not deliver event duration information to media application 112. Therefore, media application 112 does not have information of a corresponding DASH timeline. This may ensure an endpoint for the event duration, but may cause an abrupt termination.

The examples of FIGS. 6A-6C may each have some media control skew.

Figure 7A:
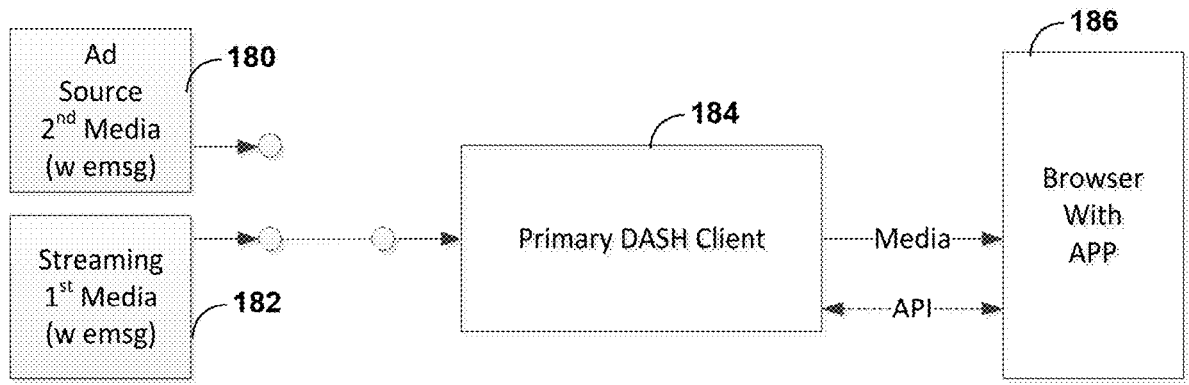
FIGS. 7A-7C are conceptual diagrams illustrating example DASH client models according to various examples of the techniques of this disclosure.
Figure 7B:
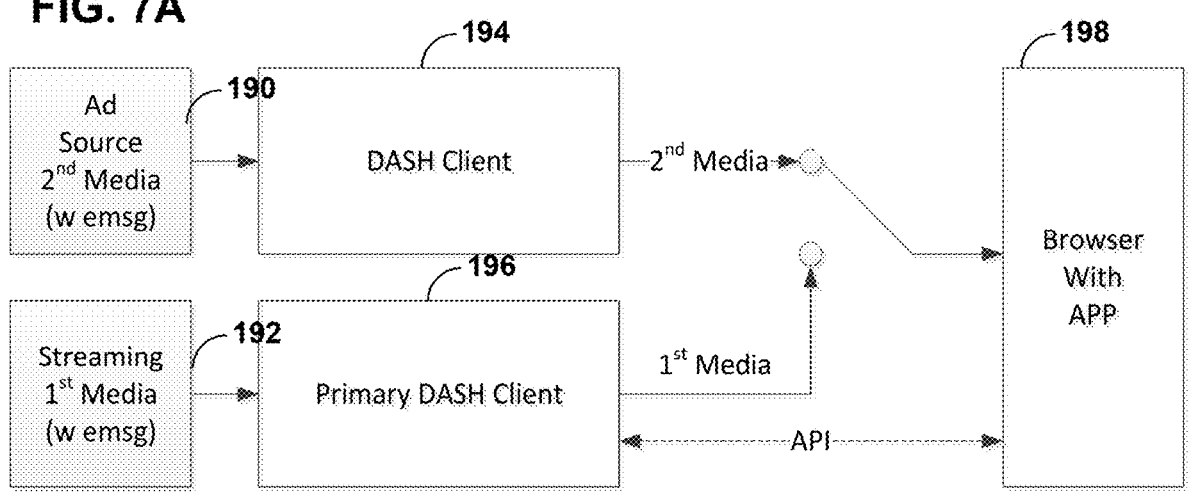
Figure 7C:
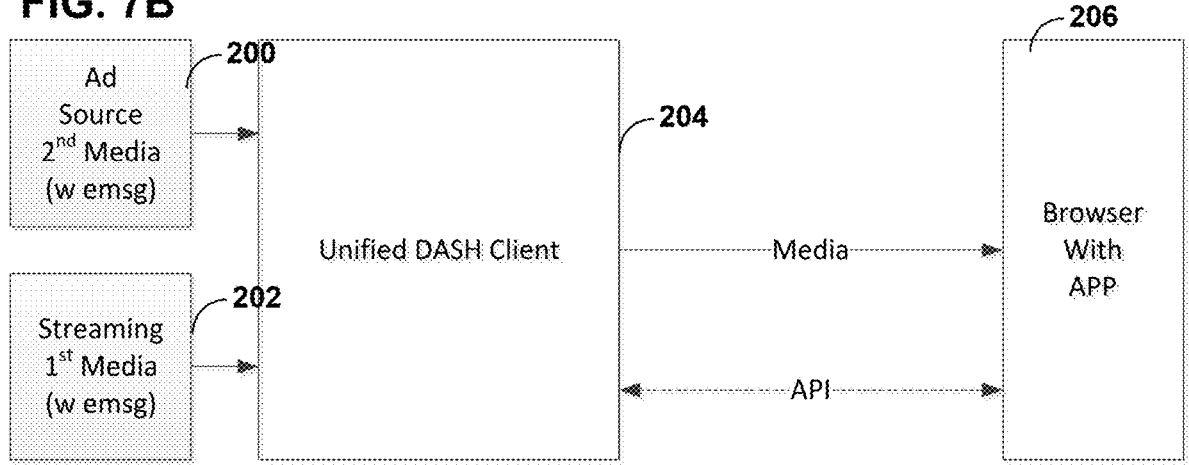

FIGS. 7A-7C are conceptual diagrams illustrating example DASH client models according to various examples of the techniques of this disclosure. FIG. 7A illustrates ad source for second media 180, streaming first media source 182, primary DASH client 184, and browser with media playback application 186. FIG. 7B illustrates ad source for second media 190, streaming first media source 192, Primary DASH client 196, DASH client 194, and browser with media playback application 198. FIG. 7C illustrates ad source for second media 200, streaming first media source 202, unified DASH client 204, and browser with media playback application 206. In each of FIGS. 7A-7C, DASH clients 184, 196, 204 depicted may correspond to, e.g., DASH client 110 (FIG. 2), while the depicted browsers with applications (apps) associated with the browser 186, 198, 206 may correspond to, e.g., media application 112 (FIG. 2).

FIG. 7A depicts an example of an input switch model. In this example, there is no glitch in response to a switch, the media data is provided in one stream. There may be a loss of connection to a primary emsg stream during an advertisement, which may include interactivity data.

FIG. 7B depicts an example of an output switch model including two DASH clients 194, 196. In this example, there is a potential glitch in response to a switch. The primary media stream is always available to primary DASH client 196.

FIG. 7C depicts an example of a dual input, single output model. In this example, there is no glitch in response to a switch. Through media is provided in one stream. Unified DASH client 204 parses the emsg stream flowing through, and may detect a "return to 1 message" on port 1 during an advertisement, e.g., a specifically marked emsg.

Figure 8:
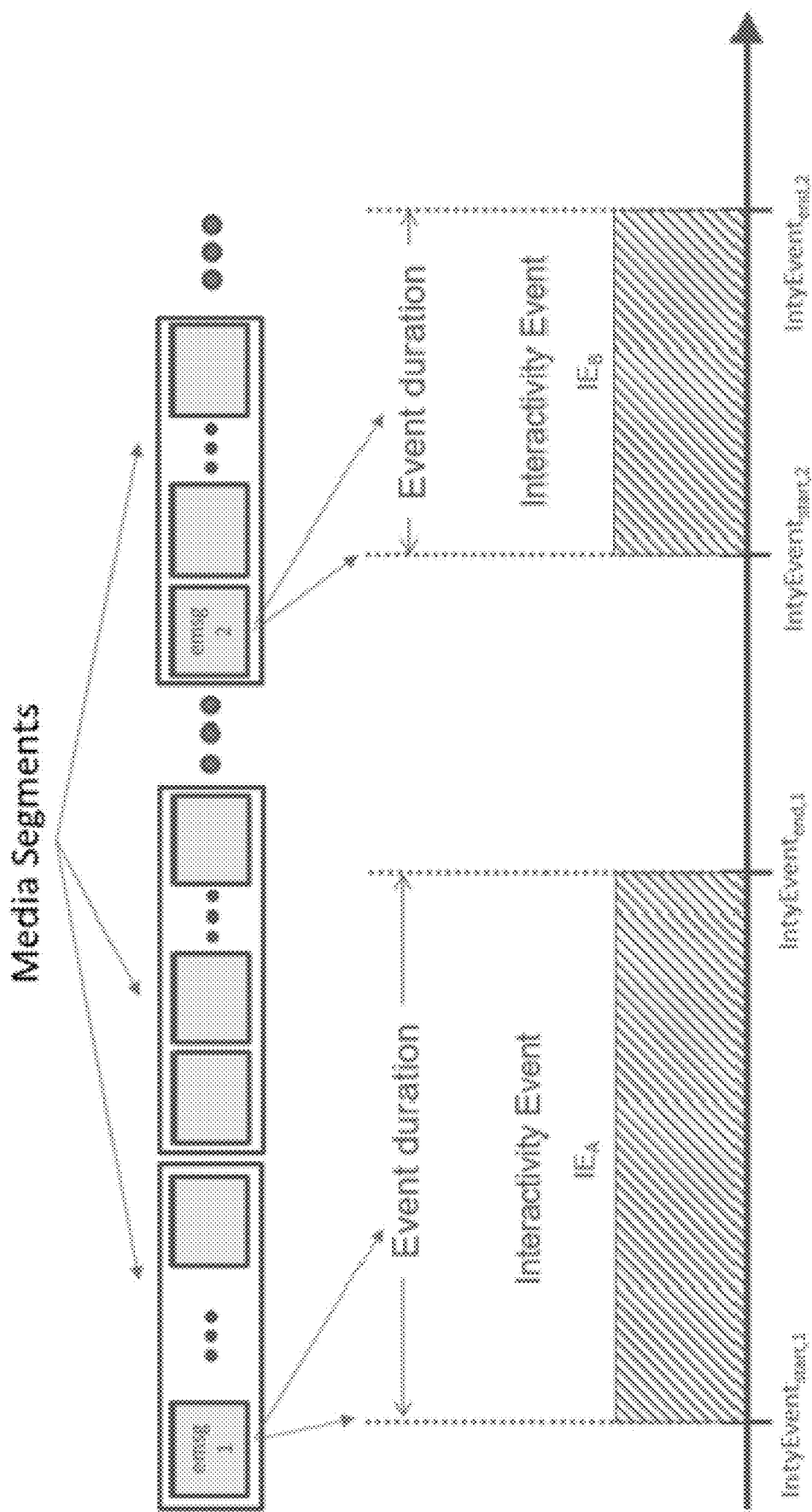
FIG. 8 is a conceptual diagram illustrating another example of event durations for application-specific interactivity events according to examples of the techniques of this disclosure.

FIG. 8 is a conceptual diagram illustrating another example of event durations for interactivity Events according to examples of the techniques of this disclosure. The example of FIG. 8 illustrates two example interactivity Events: $IE_A$ and $IE_B$. In one example technique, DASH client 110 (FIG. 2) sends media application 112 (FIG. 2) information contained in the id and message_data fields of "emsg" as discussed above. In some examples, DASH client 110 may additionally send event_duration (units in ticks) and timescale (in ticks/sec) to media application 112 to inform media application 112 as to the duration of the Event in media time. Additionally or alternatively, DASH client 110 may also convert the Event duration information contained in "emsg" to time duration in whole and fractional seconds, and send the calculated duration values to media application 112. Media application 112 is assumed to have access to a system clock of known frequency to enable time calculation.

Assuming a current media time is earlier than the Event start (given by presentation_time), for either of the options discussed above, DASH client 110 may dispatch the above Event information prior to the Event start and include either the time to Event start or the current media time of this dispatch and Event start time. DASH client 110 may later on notify media application 112 of actual Event start. Additionally or alternatively, DASH client 110 may dispatch Event information when the current media time reaches the Event start (as given by presentation_time).

Media application 112 may then identify interactivity logic to run (by id, and possibly supplemented by information in message_data), with resulting activation of an interactivity event. Media application 112 may use a validity period as given by the Event duration (computed from information received from DASH client 110, or corresponding to data given by DASH client 110).

As an alternative example, DASH client 110 may only send information contained in the id and message_data fields of "emsg," and the current media time to media application 112. When DASH client 110 sends this information, the Event start and duration may be assumed to be embedded in the message_data field. Media application 112 is assumed to have access to a system clock to determine actual occurrences of Event start and expiry.

As in the example above, DASH client 110 may determine to either dispatch Event information prior to the Event start and include either the time to Event start or the current media time of this dispatch and Event start time. DASH client 110 may additionally notify media application 112 of Event start time. Alternatively, DASH client 110 may dispatch Event information when the current media presentation time reaches the Event start time.

Also as in the example above, media application 112 may then identify interactivity logic to run (by id, and possibly supplemented by information in message_data), with resulting activation of an interactivity event. Media application 112 may use a validity period as given by the Event duration (conveyed within message_data).

The following is another example interactivity Event timing model according to examples of the techniques of this disclosure. The following terms, definitions and operating assumptions apply and assume a 1:1 correspondence between a DASH Event (matching subscribed scheme Id) and an interactivity event, IntyEvent, whose functionality is defined by the interactivity logic. An interactivity event represents an interval during which interactive content and/or UI controls are presented to the user, enabling corresponding user engagement. Interactivity event start time, $IntyEvent_{start}$, as set by the App, may either:

coincide with Event start as indicated in 'emsg' (by presentation_time) given that, at the time of 'emsg' reception by DASH client 110, its current media time is earlier than Event start, and DASH client 110 chooses to dispatch Event info to media application 112 prior to Event start, along with either a) the time to Event start, or b) the current media time of this dispatch and the Event start time; or coincide with the exact time that media application 112 receives the Event Info, without the above timing data, and given that at the time of 'emsg' reception by DASH client 110, its current media presentation time is either earlier than or equal to presentation_time, or is later than presentation_time but the Event has not expired.

In this example, interactivity event end time, $IntyEvent_{end}$, is given by [$IntyEvent_{start}$+Event duration]. Media application 112, executing the interactivity logic, is assumed to have access to a stable clock reference for determining $IntyEvent_{end}$. It depends on the interactivity logic whether an ongoing IntyEvent is allowed to extend into the next IntyEvent and possibly suppress the occurrence of the latter event. It is possible for an active interactivity event to be interrupted and terminated by media application 112 reception of a new Event with the same id. For example, a content service provider (e.g., content preparation device 20 and/or server device 60) may determine to dynamically terminate a program break in resuming main program play-out.

Figure 9:
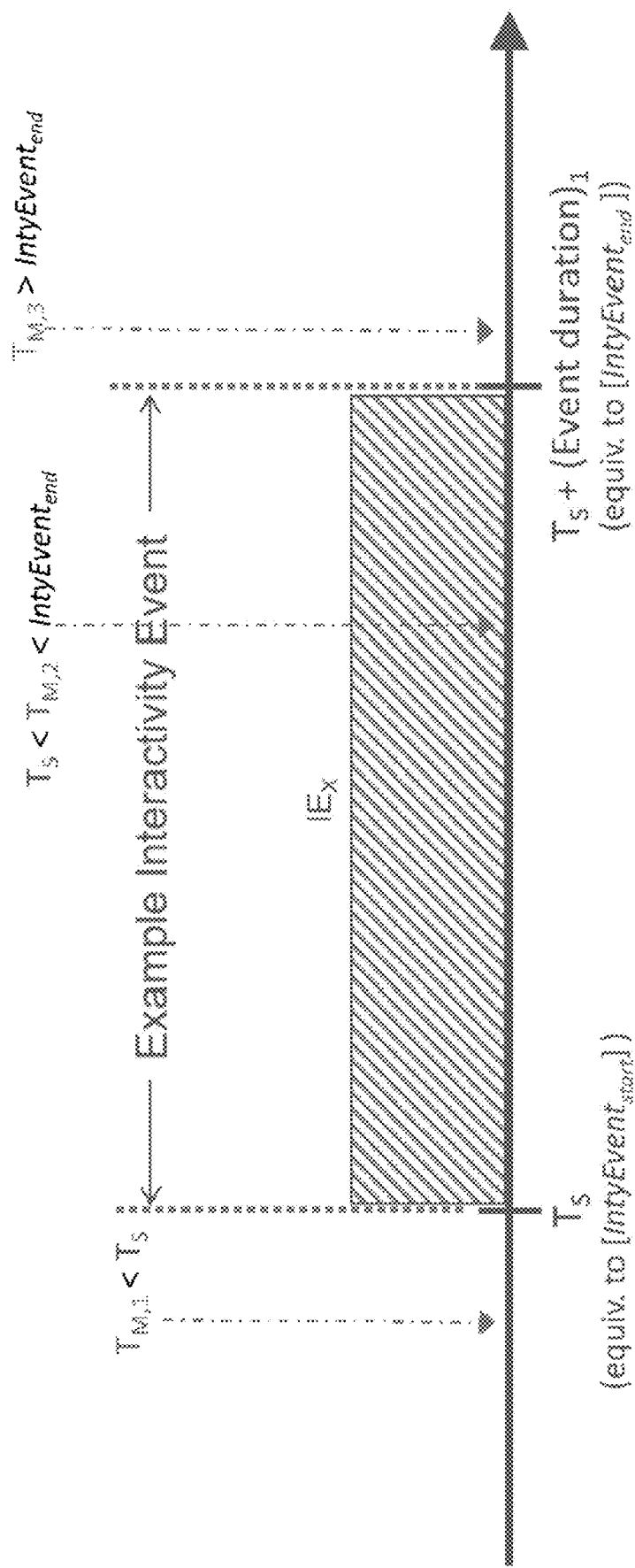
FIG. 9 is a conceptual diagram illustrating various examples of tasks that may be performed by a DASH client at various times.

FIG. 9 is a conceptual diagram illustrating various examples of tasks that may be performed by DASH client 110 at various times. In particular, FIG. 9 depicts actions that DASH client 110 may perform at current media presentation times of ($T_{M,1}$, $T_{M,2}$ and $T_{M,3}$) when DASH client 110 detects the arrival of the interactivity-specific 'emsg'). At $T_{M,1}$, DASH client 110 determines to store the Event and dispatches Event's id and (message_data)$_1$ to media application 112 at the precise moment that media presentation time matches the Event's derived start time, $T_S$. [$IntyEvent_{start}$]$_1$=$T_S$ and [$IntyEvent_{end}$]$_1$=$T_S$+(Event duration)$_1$, in this example.

At $T_{M,2}$, DASH client 110 immediately dispatches Event's id and (message_data)$_2$ to media application 112. In this example, [$IntyWindow_{start}$]$_2$=$T_{M,2}$ and [$IntyWindow_{end}$]$_2$=$T_{M,2}$ (Event duration)$_2$.

At $T_{M,3}$, because $T_{M,3}$>$T_S$+(event_duration)$_3$, DASH client 110 ignores the Event. That is, DASH client 110 does not dispatch the event to media application 112.

Figure 10:
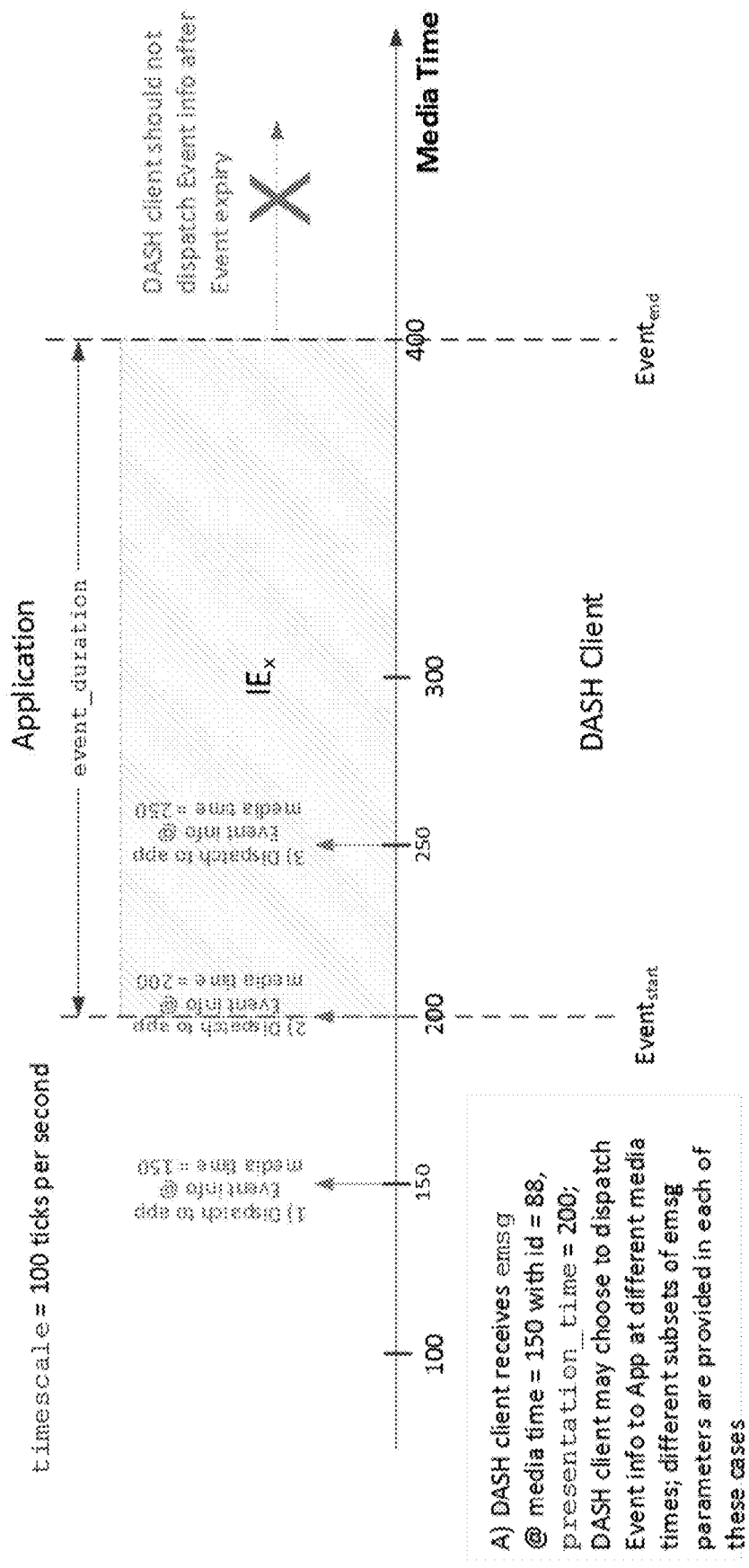
FIG. 10 is a conceptual diagram illustrating another example interactivity timing model according to the techniques of this disclosure.

FIG. 10 is a conceptual diagram illustrating another example interactivity timing model according to the techniques of this disclosure. In this example, the assumed time of reception of 'emsg' by DASH client 110, and in turn, whether, when, and how DASH client 110 determines to dispatch the Event information to media application 112, may be as described below.

In some examples, DASH client 110 may elect to dispatch Event info either immediately upon 'emsg' reception or later, as long as the dispatch time is earlier than Event expiry (given by presentation_time+event_duration).

In some examples, in addition to id and message_data, DASH client 110 may provide to media application 112 the event_duration and timescale values, or the computed Event duration in elapsed time.

In some examples, DASH client 110 may also include in the dispatched Event info the current media time. If not provided, media application 112 should assume that the Event start time coincides with its reception of the Event information from DASH client 110.

Figure 11:
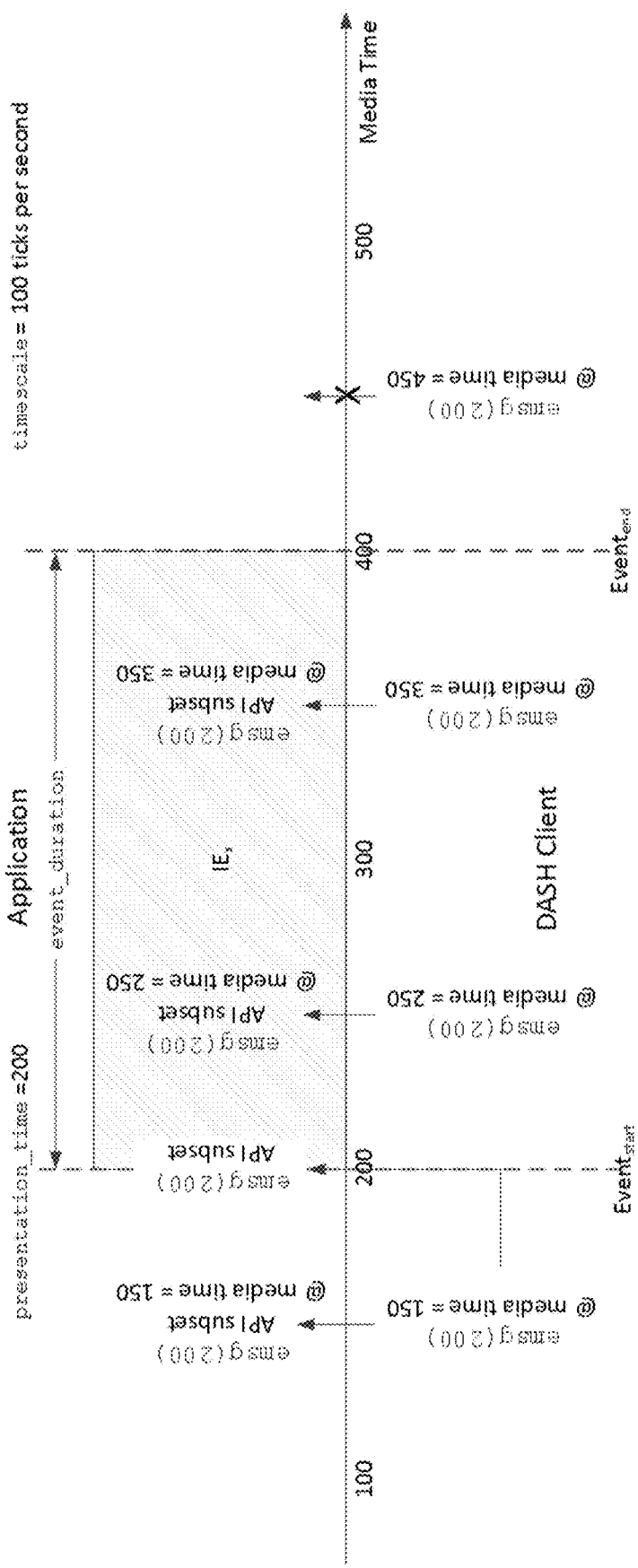
FIG. 11 is a conceptual diagram illustrating another example interactivity timing model according to the techniques of this disclosure.

FIG. 11 is a conceptual diagram illustrating another example interactivity timing model according to the techniques of this disclosure. FIG. 11 depicts an example of media delivery from server device 60 (FIG. 1) to DASH client 110 (FIG. 2), multiple instances of the 'emsg' of a given id value, corresponding to multiple RAPs (Random Access Points) in the stream, to enable the App (via DASH client) to join an Event in progress. In one example, if media application 112 is active when DASH client 110 receives the 'emsg' (id=200) at media time=150, DASH client 110 may elect to dispatch Event info to media application 112 a) immediately or b) when current media time=Event start time=200. In another example, if media application 112 is activated after the Event has started, and DASH client 110 receives 'emsg' (id=200) at media time=250 or 350, DASH client 110 may dispatch to media application 112 the Event info contained in that 'emsg', but not for the 'emsg' arriving at media time=450.

In summary, service interactivity during main program may be defined by one or more instances of Interactivity Window, each of which contains one or more Interactivity Events. An interactivity event may have well-defined start and end times, $IntyEvent_{start}$ and $IntyEvent_{end}$, respectively. $IntyEvent_{start}$ may be established by different criteria, which may depend on when and how DASH client 110 dispatches Event info to media application 112, as previously described. $IntyEvent_{end}$ may be given by [$IntyEvent_{start}$+ Event duration].

DASH client 110 may, in response to receiving an Event of interest (matching schemeIdUri and value as subscribed to by media application 112) dispatch Event info to media application 112, as long as the current media time is earlier than the derived Event start time+event_duration (equivalent to expiration of the interactivity event from the perspective of media application 112).

Figure 12:
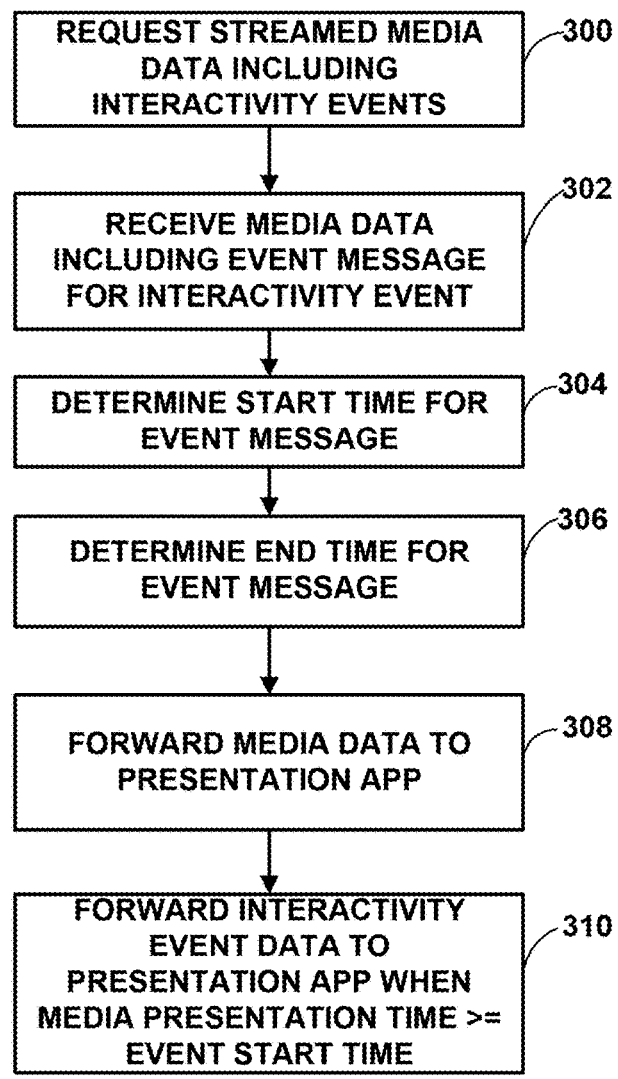
FIG. 12 is a flowchart illustrating an example method for performing techniques of this disclosure.

FIG. 12 is a flowchart illustrating an example method in accordance with the techniques of this disclosure. The method of FIG. 12 is explained with respect to DASH client 110 of FIG. 2. However, it should be understood that in other examples, other devices or units may be configured to perform this or a similar method. For example, the various DASH clients 184, 196, 204 of FIGS. 7A-7C may be configured to perform this or a similar method.

Initially, DASH client 110 requests streamed media data including interactivity events (300). That is, the streamed media data may include corresponding interactivity events that are to be presented at specified times, e.g., within interactivity windows, in accordance with the techniques of this disclosure.

DASH client 110 may then receive media data (e.g., a segment) including one or more Event messages for interactivity events (302). DASH client 110 may determine a start time for each of the Event messages (304), as well as end times for the event messages (306). DASH client 110 may forward media data to media application 112 (308). DASH client 110 may also forward interactivity event data to media application 112 when a current media presentation time is greater than or equal to the event start time (310). In particular, as explained above, if the event message is received at or before the event start time, DASH client 110 may wait until the current media presentation time is equal to the event start time. If the current media presentation time is greater than the event start time, and a duration for the event plus the current media presentation time is less than the event end time, DASH client 110 may forward the interactivity event data immediately. However, if the current media presentation time plus the duration for the event is greater than the event end time, DASH client 110 may disregard the interactivity event data.

In this manner, the method of FIG. 12 represents an example of a method including determining, by a streaming client of a device, the streaming client implemented in circuitry of the device, a start time for an Event message corresponding to an interactivity window during which one or more interactivity events can occur during presentation of media data, the interactivity events comprising times during which a user of the device can interact with the presented media data, determining, by the streaming client, an end time for the Event message corresponding to the interactivity window, receiving, by the streaming client, data representative of at least one of the interactivity events during the interactivity window corresponding to the Event message, and forwarding, by the streaming client, the data representative of the at least one of the interactivity events to a media presentation application of the device, the media presentation application implemented in circuitry of the device.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code, and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of retrieving media data, the method comprising:
   determining, by a streaming client of a device, the streaming client implemented in circuitry of the device, a start time for an event message corresponding to an interactivity window during which one or more application-specific interactivity events can occur during presentation of media data, the application-specific interactivity events comprising times during which a user of the device can interact with the presented media data;
   determining, by the streaming client, an end time for the event message corresponding to the interactivity window;
   receiving, by the streaming client, data representative of at least one of the application-specific interactivity events during the interactivity window corresponding to the event message; and
   forwarding, by the streaming client, the data representative of the at least one of the application-specific interactivity events to a media presentation application of the device, the media presentation application implemented in circuitry of the device, wherein forwarding the data representative of the at least one of the application-specific interactivity events comprises forwarding at least one of a plurality of event messages corresponding to the at least one of the application-specific interactivity events, comprising:
   determining, by the streaming client, a start time for the at least one of the event messages;
   determining, by the streaming client, that a current media presentation time is smaller than the start time for the at least one of the event messages;
   in response to determining that the current media presentation time is smaller than the start time for the at least one of the event messages, dispatching, by the streaming client, the data representative of the at least one of the event messages to the media presentation application.

2. The method of claim 1, further comprising:
   receiving, by the streaming client from the media presentation application, a subscription to DASH events, corresponding to interactivity events, having a particular identifier value;
   parsing, by the streaming client, segments of a representation of the media data, the segments of the representation including the one or more DASH events;
   detecting, by the streaming client, the at least one of the DASH events through parsing the representation; and
   determining, by the streaming client, that the at least one of the DASH events has the particular identifier value,
   wherein forwarding the data representative of the at least one of the DASH events corresponding to interactivity events comprises forwarding the data representative of the at least one of the application-specific interactivity events in response to determining that the at least one of the DASH events has the particular identifier value.

3. The method of claim 1, wherein dispatching comprises:
   buffering, by the streaming client, the data representative of the at least one of the event messages; and
   dispatching, by the streaming client, the data representative of the at least one of the event messages to the media presentation application when a subsequent media presentation time matches the start time for the at least one of the event messages.

4. The method of claim 1, further comprising:
   determining, by the streaming client, a start time for a second one of the event messages corresponding to interactivity event messages;
   determining, by the streaming client, a duration for the second one of the event messages corresponding to the interactivity event messages;
   determining, by the streaming client, whether a current media presentation time is larger than the start time plus the duration for the second one of the event messages corresponding to the interactivity event messages;
   in response to determining that the current media presentation time is larger than the start time plus the duration for the second one of the event messages corresponding to the interactivity event messages, abstaining from dispatching data representative of the second one of the event messages corresponding to the interactivity event messages to the media presentation application; and
   in response to determining that the current media presentation time is less than or equal to the start time plus the duration for the second one of the event messages corresponding to the interactivity event messages, dispatching data representative of the second one of the event messages corresponding to the interactivity event messages to the media presentation application.

5. The method of claim 1, wherein forwarding the data representative of the at least one of the event messages corresponding to interactivity event messages comprises forwarding an inband event message (EMSG) box including the data representative of the at least one of the event messages corresponding to interactivity event messages, wherein the EMSG box includes an identifier attribute for the at least one of the event messages corresponding to interactivity event messages and a message data attribute for the at least one of the event messages corresponding to interactivity event messages.

6. The method of claim 1, further comprising processing a manifest file for the media data, wherein processing the manifest file comprises determining that the manifest file includes data indicating that the media data includes the one or more event messages, in the form of the EMSG boxes, corresponding to interactivity event messages, and wherein the data of the manifest file indicates at least one of one or more representations of the media data or one or more adaptation sets of the media data that include the one or more event messages, in the form of the EMSG boxes, corresponding to interactivity event messages.

7. The method of claim 1, wherein forwarding the data representative of the at least one of the event messages corresponding to interactivity event messages comprises forwarding data from an inband event message, EMSG box, including the data representative of the at least one of the event messages corresponding to interactivity event messages, the data from the EMSG box comprising an identifier value and a message_data element of the EMSG box.

8. The method of claim 7, further comprising forwarding values of one or more of a timescale element of the EMSG box, a presentation_time element of the EMSG box, or an event_duration element of the EMSG box to the media presentation application.

9. The method of claim 7, further comprising:
calculating an event_duration value in elapsed time from values of a timescale element of the EMSG box, and an event duration element of the EMSG box; and
forwarding the calculated event duration value to the media presentation application.

10. The method of claim 1, wherein determining the start time for the interactivity window and determining the end time for the interactivity window comprises determining the start time for the interactivity window and determining the end time for the interactivity window from a first events message, the method further comprising:
receiving a second, different event message corresponding to interactivity event message indicating an updated end time for the interactivity window, the updated end time being earlier than the determined end time; and
in response to the second event message, forwarding data representative of the updated end time to the media presentation application.

11. The method of claim 1, wherein forwarding the data representative of the at least one of the event messages corresponding to interactivity event messages comprises forwarding data of a manifest file for the media data.

12. The method of claim 11, wherein the manifest file comprises a media presentation description (MPD), wherein the data of the manifest file comprises an EventStream element in a Period element of the MPD, wherein the EventStream element includes common information for the at least one of the event streams contained in the MPD, each of the event streams comprising one or more event messages corresponding to interactivity event messages that include an identifier, event timing related information, and a message data attribute for each of the event messages corresponding to interactivity event messages.

13. The method of claim 12, wherein the common information comprises at least one of an identifier value or a timescale value, wherein the identifier value comprises a schemeIdUri or a schemeIdUri and value pair.

14. The method of claim 12, wherein each of the one or more event messages of the event stream corresponds to an instance of an event child element of the EventStream element, and wherein event timing information of the event messages includes an event start time corresponding to the presentation start time of the event relative to a start of a period containing the event, and a duration of the event.

15. The method of claim 1, further comprising:
receiving, by the streaming client, a second event message (EMSG) for an interactivity event of media data at a current media time earlier than an event start time for the EMSG; and
dispatching, by the streaming client, event information for the EMSG to the media presentation application either immediately, when a new current media time matches the event start time, or at a later media time such that the later media time plus a duration for the interactivity event is less than an expiration time for the interactivity event.

16. The method of claim 15, further comprising, when the streaming client dispatches the event information immediately, sending, by the streaming client, data included in the EMSG, including a timescale value, a presentation time value, and an event duration value, to the media presentation application and a media time when the dispatch occurs.

17. The method of claim 15, further comprising, when the streaming client dispatches the event information immediately:
calculating a difference value between a dispatch time and the event start time; and
sending the difference value, a timescale value, and an event duration value from the EMSG to the media presentation application.

18. The method of claim 15, wherein when the streaming client dispatches the event information when the new current media time matches the event start time, the method further comprises sending, by the streaming client, data included the EMSG, including a timescale value and an event duration value, to the media presentation application.

19. The method of claim 18, wherein the streaming client further sends at least one of a presentation time value from the EMSG or a media time of dispatch occurrence to the media presentation application.

20. The method of claim 18, wherein receiving comprises receiving the EMSG at a media time equal to the event start time.

21. The method of claim 15, further comprising, when the streaming client dispatches the event information at the later time, sending, by the streaming client, data included the EMSG, including a timescale value, a presentation value, and an event duration value, and a media time of the dispatch to the media presentation application.

22. The method of claim 21, wherein receiving comprises receiving the EMSG at a time later than the event start time but before the expiration time.

23. The method of claim 15, wherein dispatching comprises dispatching only an identifier value and a message_data field of the EMSG to the media presentation application to indicate that all event timing information is embedded in the message_data field.

24. The method of claim 1, further comprising, in response to the user of the device tuning into a program corresponding to the media data after the program has started, activating the streaming client and the media presentation application.

25. A device for receiving media data, the device comprising a streaming client and a media presentation application configured in one or more processors implemented in circuitry, wherein the streaming client is configured to:
- determine a start time for an event message corresponding to an interactivity window during which one or more application-specific interactivity events can occur during presentation of media data, the application-specific interactivity events comprising times during which a user of the device can interact with the presented media data;
- determine an end time for the event message corresponding to the interactivity window;
- receive data representative of at least one of the application-specific interactivity events during the interactivity window corresponding to the event message; and
- forward the data representative of the at least one of the application-specific interactivity events to the media presentation application, wherein to forward the data representative of the at least one of the application-specific interactivity events, the streaming client is configured to forward at least one of a plurality of event messages corresponding to the at least one of the application-specific interactivity events, and wherein to forward the at least one of the event messages, the streaming client is configured to:
  - determine a start time for the at least one of the event messages;
  - determine that a current media presentation time is smaller than the start time for the at least one of the event messages; and
  - in response to determining that the current media presentation time is smaller than the start time for the at least one of the event messages, dispatch the data representative of the at least one of the event messages to the media presentation application.

26. The device of claim 25, wherein the streaming client is further configured to:
- receive, from the media presentation application, a subscription to DASH events, corresponding to interactivity events, having a particular identifier value;
- parse segments of a representation of the media data, the segments of the representation including the one or more DASH events;
- detect the at least one of the DASH events through parsing the representation; and
- determine that the at least one of the DASH events has the particular identifier value,
- wherein the streaming client is configured to forward the data representative of the at least one of the application-specific interactivity events in response to determining that the at least one of the DASH events has the particular identifier value.

27. The device of claim 25, wherein the streaming client is configured to forward a media presentation description (MPD) for the media data, the MPD including the data representative of the at least one of the event messages corresponding to interactivity event messages, wherein the data of the MPD comprises an EventStream element in a Period element of the MPD, wherein the EventStream element includes common information for the at least one of the event streams contained in the MPD, each of the event streams comprising one or more event messages corresponding to interactivity event messages that include an identifier, event timing related information, and a message data attribute for each of the event messages corresponding to interactivity event messages.

28. The device of claim 25, wherein the streaming client is further configured to:
- receive a second event message (EMSG) for an interactivity event of media data at a current media time earlier than an event start time for the EMSG; and
- dispatch event information for the EMSG to the media presentation application either immediately, when a new current media time matches the event start time, or at a later media time such that the later media time plus a duration for the interactivity event is less than an expiration time for the interactivity event.

* * * * *